(12) United States Patent
Saito et al.

(10) Patent No.: US 6,795,697 B2
(45) Date of Patent: Sep. 21, 2004

(54) RF RECEIVER SWITCHES

(75) Inventors: Elna R. Saito, Santa Barbara, CA (US); Gregory L. Hey-Shipton, Santa Barbara, CA (US); James R. Costa, Lompoc, CA (US); Stacey M. Bilski, Santa Barbara, CA (US)

(73) Assignee: Superconductor Technologies, Inc., Santa Barbara, CA (US)

( * ) Notice: Subject to any disclaimer, the term of this patent is extended or adjusted under 35 U.S.C. 154(b) by 0 days.

(21) Appl. No.: 10/190,328

(22) Filed: Jul. 5, 2002

(65) Prior Publication Data

US 2004/0005871 A1 Jan. 8, 2004

(51) Int. Cl.[7] .............................................. H04B 1/10
(52) U.S. Cl. ...................... 455/287; 455/280; 455/299; 335/4
(58) Field of Search ............................... 455/280, 287, 455/561, 299, 296, 338, 339, 335, 117, 307, 217; 335/1, 2, 4; 338/32 R

(56) References Cited

U.S. PATENT DOCUMENTS

| | | | |
|---|---|---|---|
| 4,492,922 A | * | 1/1985 | Ohkubo .................... 338/32 R |
| 4,565,972 A | | 1/1986 | Kaegebein |
| 5,020,138 A | * | 5/1991 | Yasuda et al. .............. 455/117 |
| 5,120,705 A | | 6/1992 | Davidson et al. |
| 5,418,490 A | | 5/1995 | Kaegebein |
| 5,604,925 A | * | 2/1997 | O'Malley et al. ........... 455/296 |
| 5,867,302 A | | 2/1999 | Fleming |
| 5,995,851 A | | 12/1999 | White |
| 6,016,092 A | * | 1/2000 | Qiu et al. ....................... 335/4 |
| 6,069,540 A | | 5/2000 | Berenz et al. |
| 6,104,934 A | * | 8/2000 | Patton et al. ............... 455/561 |
| 6,124,650 A | | 9/2000 | Bishop et al. |
| 6,168,395 B1 | | 1/2001 | Quenzer et al. |
| 6,205,340 B1 | * | 3/2001 | Yandrofski et al. ......... 455/561 |
| 6,212,404 B1 | | 4/2001 | Herstig |
| 6,236,300 B1 | | 5/2001 | Minners |
| 6,239,685 B1 | | 5/2001 | Albrecht et al. |
| 6,263,215 B1 | | 7/2001 | Patton et al. |
| 6,294,847 B1 | | 9/2001 | De Los Santos |
| 6,303,885 B1 | | 10/2001 | Hichwa et al. |
| 6,307,169 B1 | | 10/2001 | Sun et al. |
| 6,384,707 B2 | | 5/2002 | Minners |
| 6,496,612 B1 | | 12/2002 | Ruan et al. |
| 6,622,028 B1 | | 9/2003 | Abdelmonem et al. |

(List continued on next page.)

FOREIGN PATENT DOCUMENTS

| | | |
|---|---|---|
| WO | WO 91/19348 A1 | 12/1991 |
| WO | WO 91/19349 A1 | 12/1991 |
| WO | WO 01/84211 A2 | 11/2001 |

OTHER PUBLICATIONS

Bautista, et al., "Superconducting NBTI & PB(CU) Band-pass Filters", IEEE Transactions On Magnetics, MAG–21, 2, Mar. 1985, 640–643.

(List continued on next page.)

*Primary Examiner*—Quochien B. Vuong
*Assistant Examiner*—Lana Le
(74) *Attorney, Agent, or Firm*—O'Melveny & Myers LLP

(57) ABSTRACT

RF switches and methods of use are provided. In one embodiment, a RF switch includes first and second switch assemblies, each comprising an elongate member and a magnetic housing on an end of the member. The magnet is disposed between contact pads for first and second circuits, and an electromagnetic source is coupled to the assemblies. Each switch has a first and second state. Another RF switch of the present invention includes a rotor, an elongate member disposed centrally through the rotor, an actuator coupled to the member and configured to rotate the member and the rotor, and a contact on the rotor that may touch a substrate. The contact is used to complete a first path or a second path.

48 Claims, 22 Drawing Sheets

U.S. PATENT DOCUMENTS

| | | | |
|---|---|---|---|
| 2001/0010488 | A1 | 8/2001 | Minners |
| 2002/0050080 | A1 | 5/2002 | Ruan et al. |
| 2002/0119805 | A1 | 8/2002 | Smith |
| 2002/0121951 | A1 | 9/2002 | Shen et al. |
| 2002/0149456 | A1 | 10/2002 | Krimmer et al. |
| 2002/0151332 | A1 | 10/2002 | Eddy |
| 2002/0173343 | A1 | 11/2002 | Narahashi et al. |
| 2002/0196110 | A1 | 12/2002 | Vaitkus et al. |
| 2003/0025580 | A1 | 2/2003 | Wheeler et al. |
| 2003/0029705 | A1 | 2/2003 | Qui et al. |
| 2003/0156006 | A1 | 8/2003 | Hanke et al. |

OTHER PUBLICATIONS

Booz–Allen, "HTSC Dual Use Applications Survey–Progress Report", Advanced Research Agency, Washington D.C., Jan. 23, 1995.

Brenner, et al., "Optimum Design Of A MEMs Switch", Modeling & Simulation of Microsystems, 2002, 214–217.

Decibel, Quandra™, The Fail Safe Tower Top Amp System. An Industry Firsti, Quantdra™ Now Your System Can Be Fail Safe With The Ultimate Tower Top System?, Decibel Products, 1992.

Prauter, et al., "Insertion Loss & Noise Temperature Contribution Of High Temperature Superconducting Bandpass Filters Centered At 2.3 & 8.45 GHz", TDA Progress Report 42–114, Aug. 19993, 61–67.

Robertson, "Two Applications Of HTS Technology On An Airborne Platform, High Tc Microwave Superconductors & Applications, SPIE –The Intl Society for Optical Engineering, 2156, Jan. 1994, 13–20.

SCT, "Reach™. A High Performance Wireless Base Station Front End", Superconducting Core Technologies, Golden, Colorado, 1995, 1–A4–3.

TX RX Systems, "800 MHz Towr Mounted Receiver Multicoupler Model 421–86–01–(XX), Angola, New York.

Meder Electronic. Confidential Preliminiary Datasheet, Part No. CRF05–1A, SPST RF Reed Relay for 50Ω Impedance, MQC–1029, Rev. 1, 11/00. 3 pages.

Soares et al., "Applications Of High–Temperature–Superconducting Filters and Cryo–Electronics for Satellite Communication", IEEE Transactions on Microwave Theory & Techniques. 48, 7, Jul. 2000, 1190–1198.

* cited by examiner

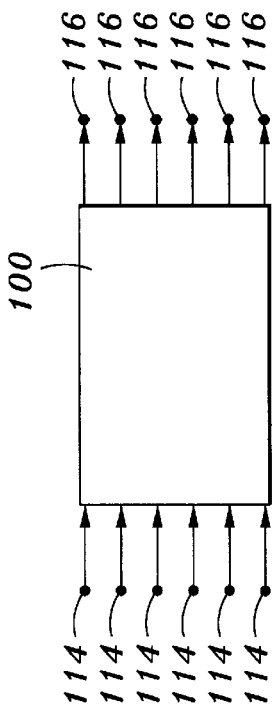
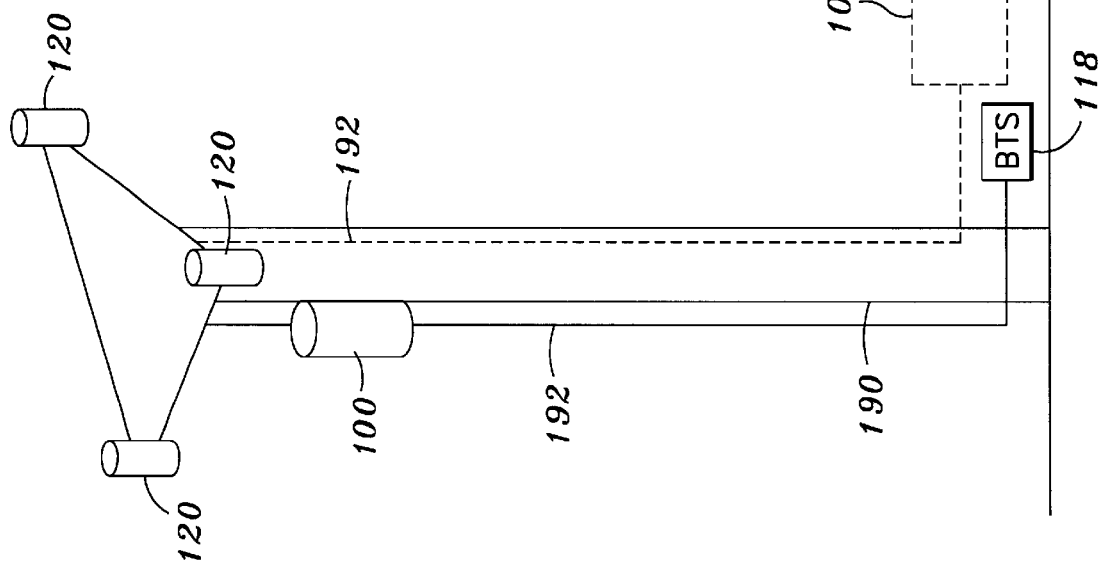

RF RECEIVER SWITCHES

STATEMENT REGARDING FEDERALLY SPONSORED RESEARCH OR DEVELOPMENT

Parts of this invention has been partially funding under government contract number MDA 972-00-C-0010.

FIELD OF THE INVENTION

The field of the invention generally relates to radio frequency (RF) switches. In one particular embodiment, the invention relates to RF switches and related bypass systems suitable for use in connection with a high temperature superconductor (HTS) based filter and a cryogenically cooled low noise amplifier (LNA).

BACKGROUND OF THE INVENTION

The increase in the number of mobile telecommunication devices in recent years and the corresponding increase in the amount of data capacity required for such devices has led to the development and implementation of high performance RF filters, including HTS-based RF filters, used in connection with RF front-end devices. HTS filters, for example, are highly selective, low loss filters that substantially decrease interference between adjacent channels.

HTS front-end RF filters require the use of a cryocooler to cool the filters and any associated electronics, such as LNAs, to around 77K. Accordingly, it is preferable that the cryocooler used to cool the filters be able to operate for long periods of time and in a variety of environmental conditions without failing. In some applications, however, a bypass feature is needed in case one or more of the HTS filters contained in the RF front-end fails to perform properly, as would be the case if the cryocooler failed. It is known, for example, td include a bypass feature on a cryogenically cooled receiver front-end that uses two conventional RF relays to bypass the HTS circuitry to direct the antenna signal directly to an output that proceeds to the base station. Because of the high selectivity of the HTS filters the relays used for the bypass function must provide high isolation between poles, typically 50 to 100 dB.

The current bypass systems have a number of limitations. First, the conventional RF relay insertion loss has a relatively high noise figure contribution, which can be 50% or more of the HTS system noise figure. As a result, the potential overall noise figure of the RF receiver is compromised. Consequently, when the system is in bypass state, and/or the LNA is removed, reverse channel, i.e., mobile-to-base, coverage is reduced. Second, conventional RF relays dissipate power in their quiescent or stable state when operated in a fail-safe mode, i.e., if there is a power failure, the relays default to the bypass state. Current relays are also not designed for cryogenic, high vacuum operation. Consequently, conventional RF relays must be located external to the cryogenic enclosure to avoid the relays using up the finite thermal budget of the cryocooler, and to avoid vacuum contamination. Third, the conventional high-isolation, low insertion loss RF relays typically used are rather large devices that increase the overall size and weight of the RF receiver.

Accordingly, there is a need for an improved RF bypass system for a receiver. There is a further need for an improved RF bypass system for an HTS-based filter/LNA RF front-end receiver that has a very low contribution to the noise figure of the overall receiver. There is also a need for a bypass system that provides for very low insertion loss, high isolation, and low intermodulation distortion in both HTS and non-HTS systems. Further, there is a need for a bypass system in which the individual switching elements can be located inside the cryogenic enclosure or other microenclosure of a RF receiver. Placing the switching elements inside the cryogenic enclosure and cooling them may substantially reduce the thermal noise contribution of the switches. Also, the individual switching elements need to have little or no power dissipation when the bypass switches are in their quiescent state to minimize load on the cryocooler.

SUMMARY OF THE INVENTION

The present invention provides for improved RF latching switches usable in both HTS and non-HTS receiver systems, and related methods of implementing the latching switches. In one aspect, a RF bypass switch comprises a first switch assembly and a second switch assembly. Each switch assembly, which may be a single throw double throw (SPDT) switch includes an elongate member and a magnet on an end of the elongate member, wherein the magnet is located between a contact pad for a first circuit and a contact pad for a second circuit. The magnet may be oriented such that the direction of the magnetic field is parallel with the length of the elongate member. An electromagnetic field source generates an electromagnetic field that may be perpendicular to the magnet on the elongate member. The electromagnetic field may also be perpendicular to the contact pads of the first circuit and second circuit. The electromagnetic field moves the magnet on the end of the elongate member, either from the first state to the second, or the second state to the first, depending on the polarity of the electromagnetic field. The contact pad for the first and second circuits are made of a ferromagnetic material, such that once the magnet on the end of the elongate member is moved to a contact pad, the magnet on the end of the elongate member is latched to the contact pad by a magnetic force.

The latching switch has a first state and a second state. In the first state, the magnet of each switch assembly is coupled-to the contact pad for the first circuit. In the second state, the magnet of each switch assembly is coupled to the contact pad for the second circuit.

The switch may be transitioned between the first and second states by applying an electromagnetic field from the electromagnetic field source. When in either of the first or second states, the switch may be maintained in that state without further application of a constant electromagnetic field due to the magnetic attraction of the ferromagnetic contact pad.

The electromagnetic field source may include a coil assembly, a lower core, an upper core, and a mid core. The lower core, upper core, and mid core parts are made of a ferromagnetic material, such that the electromagnetic field that is produced can be concentrated and directed in the vicinity of the magnet on the switch. In particular, the electromagnetic field source may be operated to generate an electromagnetic current travelling in a first direction to transition the switch to the first state. When operated to generate an electromagnetic current in the opposite direction, the switch is transitioned to the second state.

A fail safe circuit may be provided. The fail safe circuit may be coupled to the electromagnetic field source. The fail safe circuit provides an electromagnetic discharge to transition the switch between the first and second states. The fail safe circuit may comprise a capacitor or a battery.

Each switch assembly may comprise BeCu or steel. Each switch assembly may also be coupled to a cryocable. A magnet housing may be provided that surrounds each magnet of the switch assemblies.

The first circuit used with the switch may be connected to a HTS circuit, and the second circuit may be a bypass circuit, a transmission line, conventional filter and LNA, or other redundant functional path. When the switch is placed in the first state, the first circuit is operable, and when placed in the second state, the second circuit is operable. Additionally, the switch may include first and second contact points on each switch assembly, wherein the first contact points are configured to couple with the contact pads of the first circuit in the first state, and the second contact points are configured to couple with the contact pads of the second circuit in the second state. The contact pads may be formed from a material such as nickel, steel, and the like.

In another aspect of the present invention, a RF switch comprises a rotor, an elongate member disposed centrally through the rotor, and an actuator assembly coupled to the elongate member and configured to rotate the elongate member. The rotor may be a dielectric rotor. Rotation of the elongate member results in rotation of the rotor. A contact is disposed on a surface of the rotor and is in communication with a substrate. The contact is configured to complete a first path or a second path. In a first state, the contact completes the first path. In a second state, the contact completes the second path. The first path may be, e.g., a HTS circuit, and the second path may be, e.g., a bypass circuit. The contact may be a plurality of contacts disposed on parallel strips. The parallel strips may be on an underside of the rotor. The contact may be formed from BeCu, rhodium and BeCu, steel, or the like. To transition the switch between states, the rotor may be displaced a number of degrees. For a typical rotary switch, for example, the rotor may be displaced 90° to transition the bypass switch between the first state and the second state.

The actuator assembly of the bypass switch may include a linear or rotary actuator, a linkage coupled to the linear or rotary actuator, a disk, which may be formed from teflon and aluminum, coupled to the linkage and disposed on an end of the elongate member, a plurality of bearings that may slidably engage a plurality of openings on the lower surface of the disk, and a spring coupled to the elongate member. The spring may compress when the disk is rotated over the bearings, thereby lifting the contact from the surface of the substrate. The disk may comprise teflon and aluminum.

In another aspect of the present invention, a HTS-based RF receiver is provided. The receiver may include a cryogenic enclosure that is in thermal communication with a cryocooler. The receiver may also include a HTS filter. The HTS filter may have an input operatively coupled to a RF input, and an output coupled to a low noise amplifier. The low noise amplifier may have an output coupled to a RF output. Both the HTS filter and the low noise amplifier may be disposed within the cryogenic enclosure. The receiver may also have a bypass system that can operate at both warm and cold temperatures. References to a cold bypass system are intended to refer to a bypass system operable at both warm and cold temperatures. The bypass system comprises a first switch, a second switch, and a bypass circuit disposed between the first switch and the second switch. Each switch may comprise a first and second switch assembly. Each switch assembly may include an elongate member and a magnet on an end of the elongate member. In a bypass state, the magnet is coupled to a contact pad for the bypass circuit. In a HTS state, the magnet is coupled to a contact pad for a circuit connected to a HTS circuit. The HTS circuit is in communication with the HTS filter.

An electromagnetic field source may be coupled to the first and second switch assemblies. Each switch assembly may be transitioned between the HTS state and the bypass state by applying an electromagnetic field from the electromagnetic field source. Also, each switch assembly may be maintained in either the HTS state or the bypass state without a constant application of an electromagnetic field. The bypass system may further include a fail safe circuit coupled to an electronic field source usable to move the magnet on the end of the elongate member between the contact pads of the bypass circuit and the circuit coupled to the HTS circuit. The fail safe circuit provides an electromagnetic discharge to transition each switch assembly between the HTS and bypass states, in the event of a power failure, failure of the electromagnetic field source, or the like. The fail safe circuit may include a capacitor or a battery.

The receiver may incorporate the bypass system within the cryogenic enclosure. In one embodiment, the receiver is mounted atop a tower.

In another aspect of the present invention a HTS-based RF receiver is provided. This receiver may include a cryogenic enclosure in thermal communication with a cryocooler, and a HTS filter having an input operatively coupled to a RF input, and an output coupled with a low noise amplifier. The low noise amplifier may have an output coupled to a RF output. In one embodiment, the HTS filter and the low noise amplifier are disposed within the cryogenic enclosure. A bypass system may be provided that includes first and second switches, a second switch, and a bypass circuit disposed between the first and second bypass switches. Each bypass may include a rotor, an elongate member disposed centrally through the rotor, and an actuator assembly coupled to the elongate member. The rotor may be a dielectric rotor. The actuator assembly rotates the elongate member, which results in rotation of the elongate member.

A contact may be disposed on a surface of the rotor. The contact is in communication with a substrate, and is configured to complete the bypass circuit in a bypass state and to complete a HTS circuit in a HTS state. The HTS circuit is in communication with the HTS filter. The contact may comprise a plurality of contacts disposed on parallel strips.

The bypass system may be disposed within the cryogenic enclosure. In one embodiment, the receiver is mounted atop a tower.

The actuator assembly of the receiver may be used to displace the rotor a certain number of degrees, such as, e.g., 90°, in order to transition the bypass switch between the HTS and bypass states. The actuator assembly may include a linear or rotary actuator, a linkage coupled to the linear or rotary actuator, a disk, which may include teflon and aluminum, coupled to the linkage and disposed on an end of the elongate member, a plurality of bearings configured to slidably engage a plurality of openings on the lower surface of the disk, and a spring coupled to the elongate member. When the disk is rotated over the bearings, the spring compresses, thereby lifting the contact from the substrate when each bypass switch is transitioned between the HTS and bypass states.

In another aspect of the present invention, a method of operating a RF receiver in a RF filtering active state and a bypass state is provided. The method may include the steps of measuring an operating parameter of the RF receiver, and switching the RF receiver to the bypass state when the measured operating parameter is outside a pre-determined operating range. Switching the RF receiver to the bypass state may be accomplished by applying an electromagnetic field to a switch having a switch assembly comprising an elongate member and a magnet, and terminating application of the electromagnetic field after the magnet of the switch assembly couples with the bypass circuit to complete the bypass circuit around a RF filter.

When the measured operating parameter is within a predetermined range, the method may include switching the RF receiver to the RF filtering active state. Switching the RF receiver to the RF filtering active state may be performed by applying an electromagnetic field to the switch, and terminating application of the electromagnetic field after the magnet of the switch assembly couples with and completes a RF filtering active circuit. The RF filtering active circuit comprises a circuit in communication with a RF filter.

In another aspect of the present invention, another method of operating a RF receiver in a RF filtering active state and a bypass state is provided. This method is performed by measuring an operating parameter of the RF receiver, and switching the RF receiver to the bypass state when the measured operating parameter is outside a pre-determined operating range by applying a force to a switch having a rotor with a contact in communication with a substrate. The substrate is in communication with a bypass circuit and a RF filtering active circuit. The RF filtering active circuit comprises a circuit in communication with a RF filter. The rotor is rotated in order to disrupt the RF filtering active circuit. The rotor is then continued to be rotated until the contact completes the bypass circuit. While rotating the rotor, the contact may be lifted from a surface of the substrate.

When the measured operating parameter is within a predetermined operating range, the receiver may be switched to the RF filtering active state. Switching the receiver to the RF filtering active state may be performed by applying a force to the switch, rotating the rotor to disrupt the bypass circuit, and continuing to rotate the rotor until the contact completes the RF filtering active circuit.

To switch the receiver between the RF filter active circuit and the bypass circuit, applying a force to the switch may be accomplished by using a linear or rotary actuator.

It is an object of the invention to provide a HTS-based RF receiver with a bypass capability. It is another object of the invention to provide a bypass solution that reduces the overall size of the device, regardless of whether the device is HTS or non-HTS.

It is yet another object of the invention to provide a low insertion loss bypass system that is used with HTS-based RF receivers. It is also an object of the invention to provide high performance RF switches usable with both HTS and non-HTS receivers.

BRIEF DESCRIPTION OF THE DRAWINGS

FIG. 11 illustrates alternative methods of mounting a RF receiver, according to the present invention. In one embodiment, the RF receiver front-end is mounted atop a tower. In the other embodiment (shown in dashed lines), the RF receiver front-end is mounted substantially at ground level, e.g., at the base of the antenna tower, on the internal or external walls of the base station, in an electronics rack within the base station, or on some other ground level structure.

FIG. 12 illustrates a RF receiver front-end having multiple inputs and outputs.

DETAILED DESCRIPTION OF THE PREFERRED EMBODIMENTS

Figure 1:
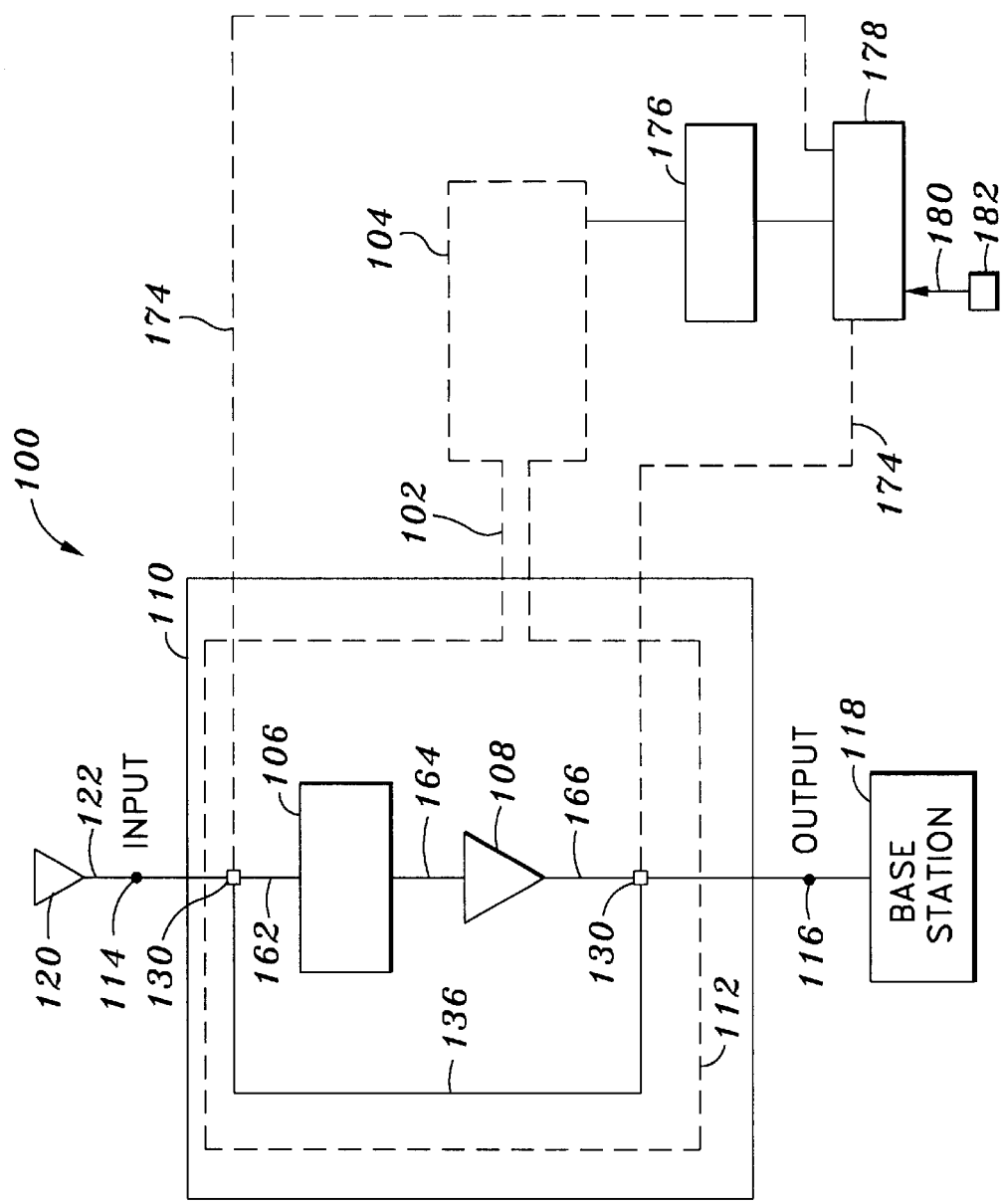
FIG. 1 is a schematic diagram of a HTS-based RF receiver according to an embodiment of the present invention.

FIG. 1 is a schematic diagram of a HTS-based RF front-end receiver 100 according to one embodiment of the present invention. The RF receiver 100 includes a cryocooler 104 that is used to cool the HTS filter(s) 106 and low noise amplifier(s) LNA(s) 108, and possibly other electronic components that may be disposed within a cryogenic enclosure 110 of the receiver 100.

The HTS filter 106 is preferably made from a thin-film superconductor, although the present invention also contemplates other constructions such as thick-film superconductors. The thin-film superconductor may comprise a yttrium containing superconductor known generally as a YBCO superconductor, a thallium-based superconducting compound, a DyBaCuO compound, a HGBaCaCuO compound, and the like. The invention, is not, however, limited to a particular type or class of superconductors, i.e., any HTS superconductor that will properly filter RF signals at HTS temperatures may be used.

The cryocooler 104 can be selected from a number of types of cryocoolers 104, including, by way of example, Stirling cycle cryocoolers, Brayton cycle cryocoolers, Gifford-McMahon cryocoolers, pulse tube cryocoolers, and the like. In one embodiment, the cryocooler 104 is a Stirling cycle cryocooler 104, which tends to be reliable and highly efficient.

The cryocooler 104 is thermally coupled at its cold end 102 to a cryogenic enclosure 110 that contains the HTS components and other electronics. The cryogenic enclosure 110 may also be placed within a vacuum dewar to minimize the transfer of heat from the external environment to the inside of the cryogenic enclosure 110. A cold stage 112 is also preferably located within the vacuum dewar. The cold stage 112 is preferably coupled to the cryogenic enclosure 110 that contains the HTS filter(s) 106, the LNA(s) 108, as well as other electronic components used in the RF receiver 100. The cold stage 112 may have a single face, or a plurality of faces to hold a number of cryogenic enclosures 110, each containing HTS filters 106 and LNAs 108.

The RF receiver 100 includes a RF input 114 through which the RF signal is passed. The RF receiver 100 also includes a RF output 116 through which the filtered and amplified RF signal is passed to the base station 118. The RF input 114 is connected to an antenna 120, via a transmission line 122, which may comprise, for example, a coaxial cable or the like. The RF input 114 is electrically coupled with a first RF switch 130.

The switch 130 may be implemented using various switch designs, such as, e.g., a reed switch design or a rotary switch design. For the reed switch design, the switch 130 is preferably latching, i.e., the switch stays in one position without further application of an electric current, in order to minimize joule heating to the cold stage 112. For either the reed or the rotary design, however, the switch 130 preferably has two stable states, i.e., a stable HTS state and a stable bypass state, such that no power is consumed when the switch 130 is in either of the quiescent, stable states. The switch 130 is particularly suited for operation in a cryogenic, vacuum environment such as would be present in a cryocooled HTS-based RF receiver. The switch 130, which is also usable in non-HTS applications and, for example, at room temperature, is discussed in further detail herein.

Figure 13:
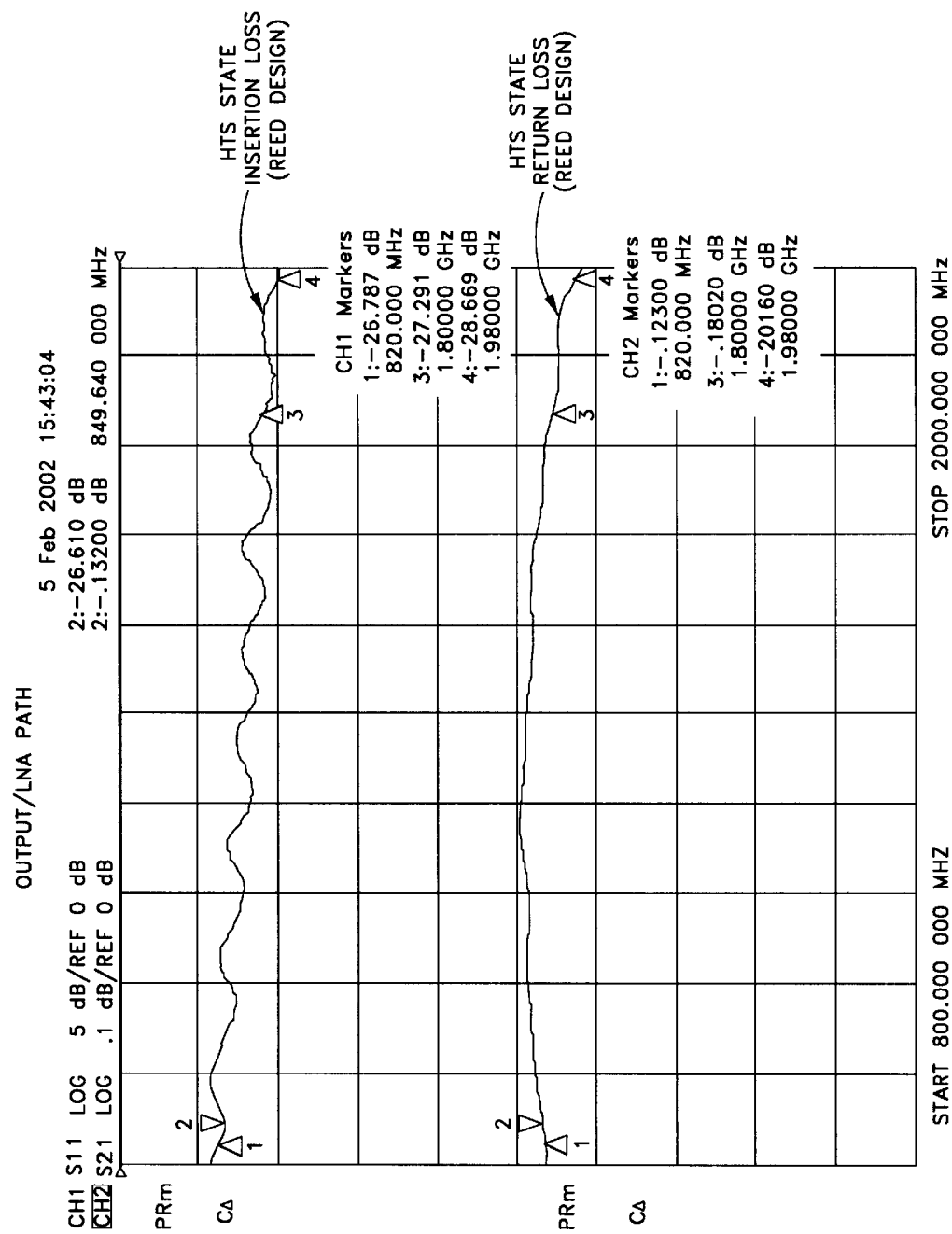
FIG. 13 is a chart of sample performance data for the output/LNA path of a reed design of a switch according to one embodiment of the present invention in the HTS state.
Figure 14:
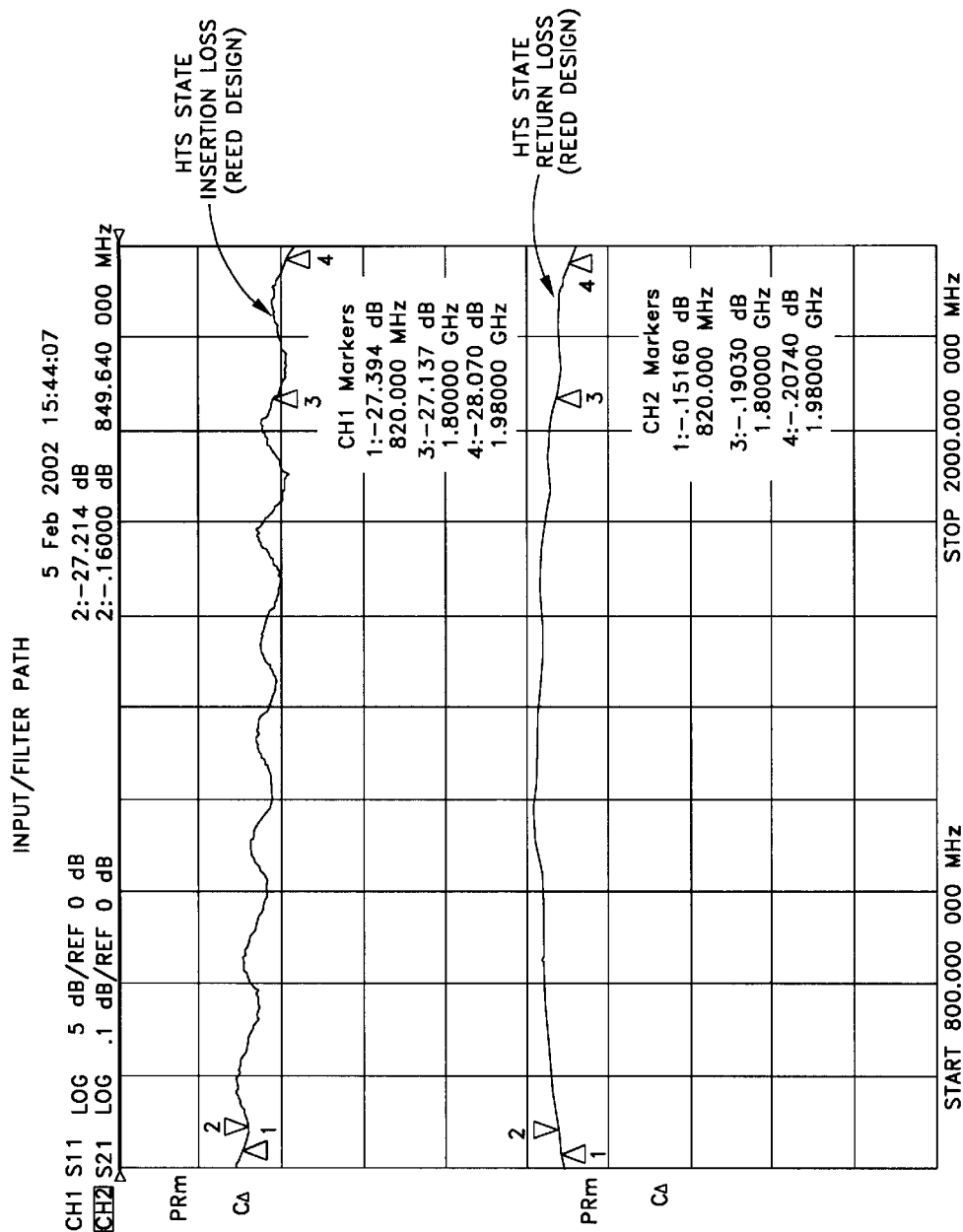
FIG. 14 is a chart of sample performance data for the input/filter path of a reed design of a switch according to one embodiment of the present invention in the HTS state.
Figure 15:
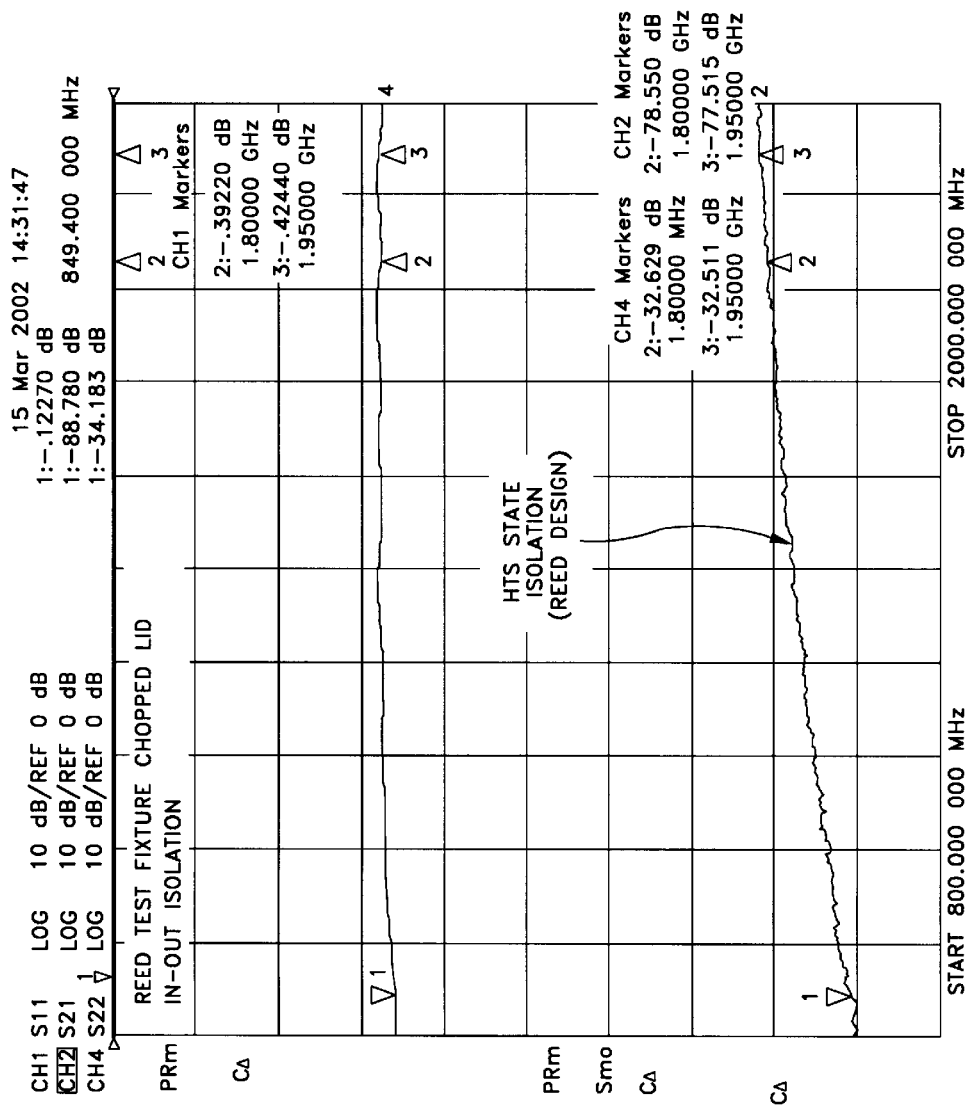
FIG. 15 is a chart of sample isolation data for a reed design of a switch according to one embodiment of the present invention in the HTS state.
Figure 16:
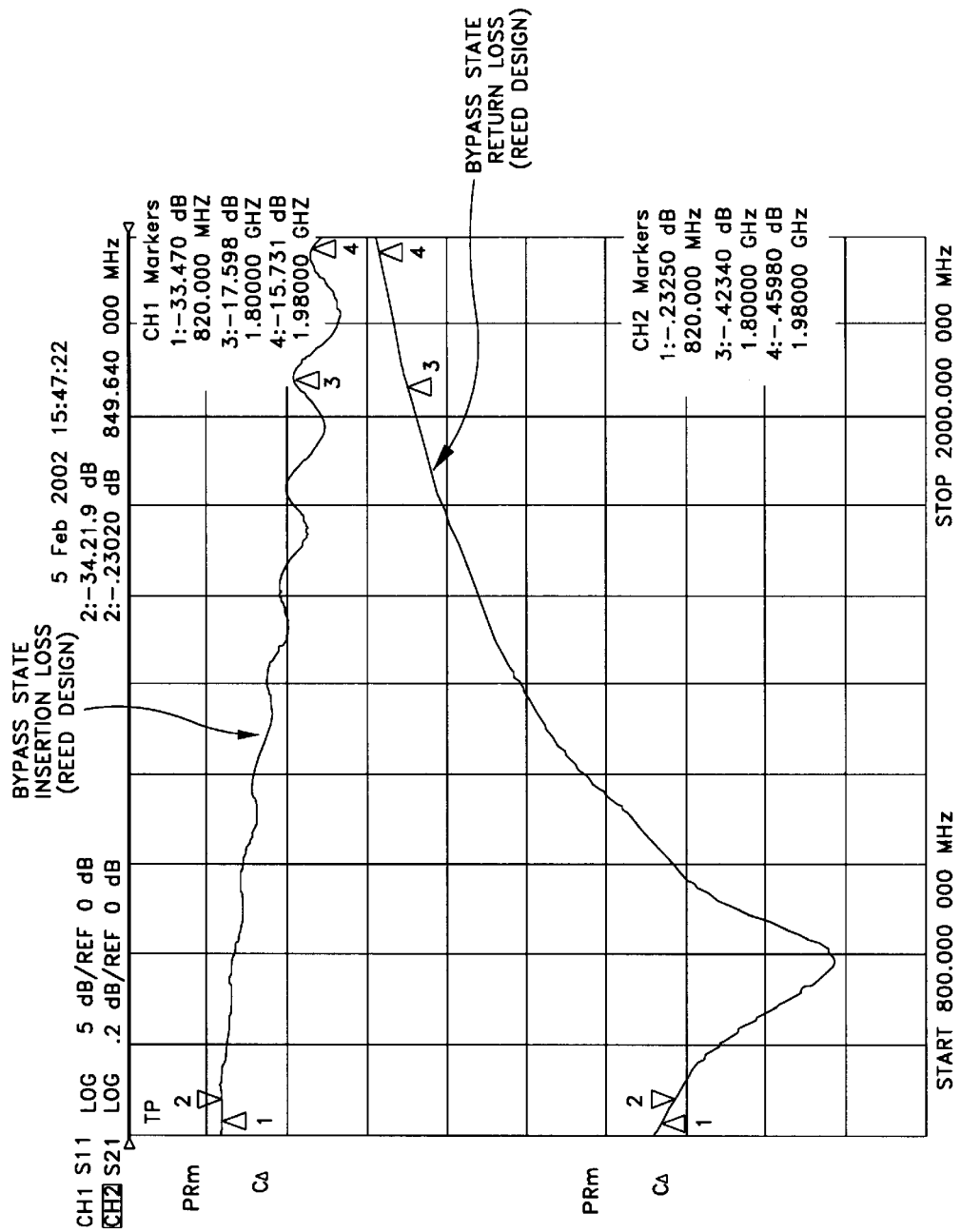
FIG. 16 is a chart of sample performance data for a reed design of a switch according to one embodiment of the present invention in the bypass state.

In one embodiment, the switch 130 is designed to operate with RF frequencies in the 0.5 to 2 GHz range. With regard to performance characteristics, and turning first to the reed switch design, FIG. 13 is a chart illustrating sample performance data for the output/LNA path of the reed switch design in the HTS state. FIG. 14 is a chart illustrating sample performance data for the input/filter path of the reed switch design in the HTS state. FIG. 15 is a chart illustrating sample isolation data for the reed switch design in the HTS state. At 800 MHz in the HTS state, the reed switch design may exhibit the following approximate figures: an insertion loss of 0.13 dB, a return loss of 25 dB, and isolation of 88 dB. At 1.9 GHz, the reed switch design in the HTS state may exhibit the following approximate figures: an insertion loss of 0.20 dB, a return loss of 28 dB, and isolation of 77 dB. FIG. 16 is a chart illustrating sample performance data for the reed switch design in the bypass state. In the bypass state at 800 MHz, the reed switch design may exhibit the following approximate figures: an insertion loss of 0.23 dB, and a return loss of 34 dB. In the bypass state at 1.9 GHz, the reed switch design may exhibit, approximately, an insertion loss of 0.46 dB, and a return loss of 16 dB.

Figure 17:
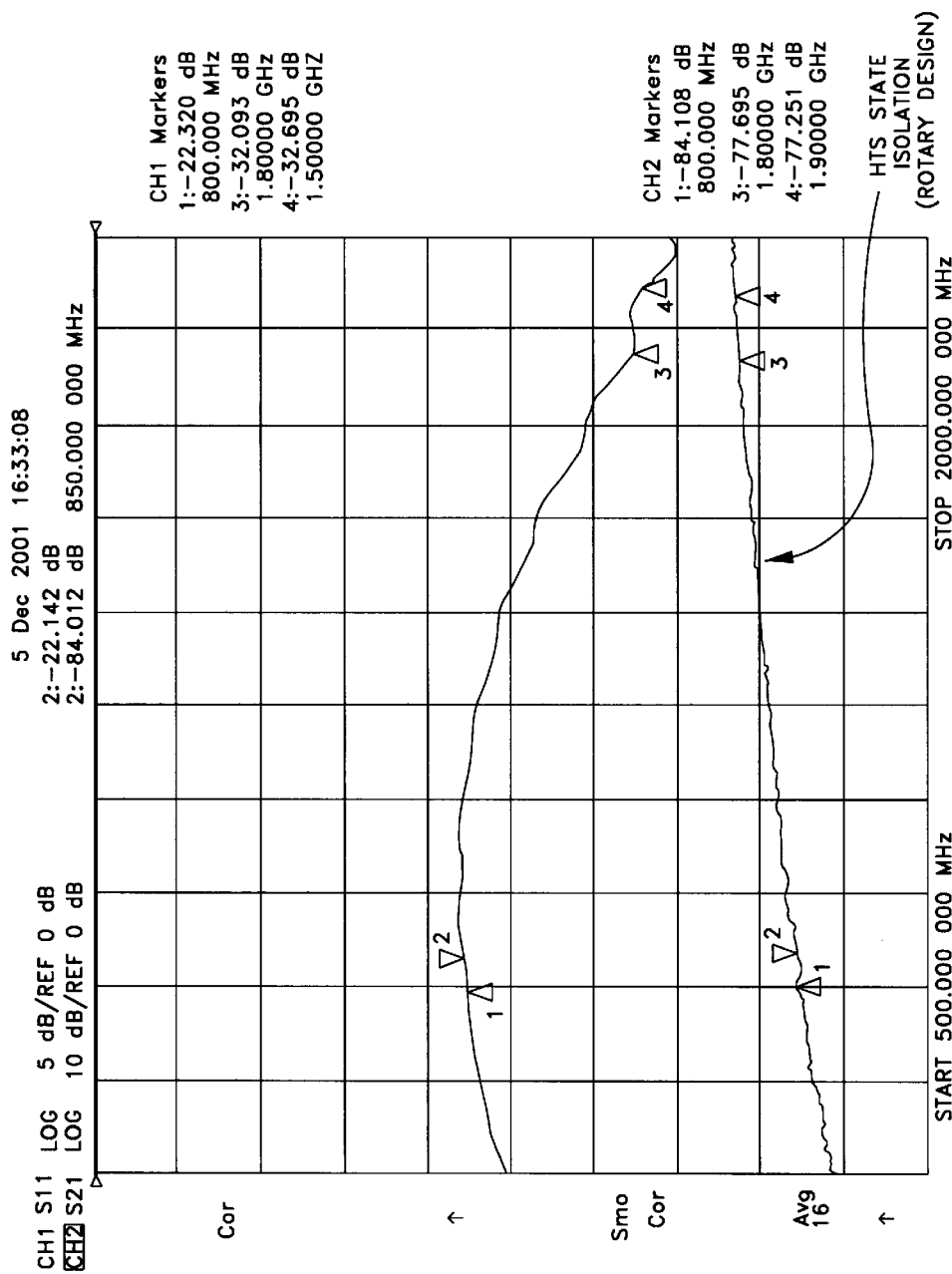
FIG. 17 is a chart of sample isolation data for a rotary design of a switch according to one embodiment of the present invention in the HTS state.
Figure 18:
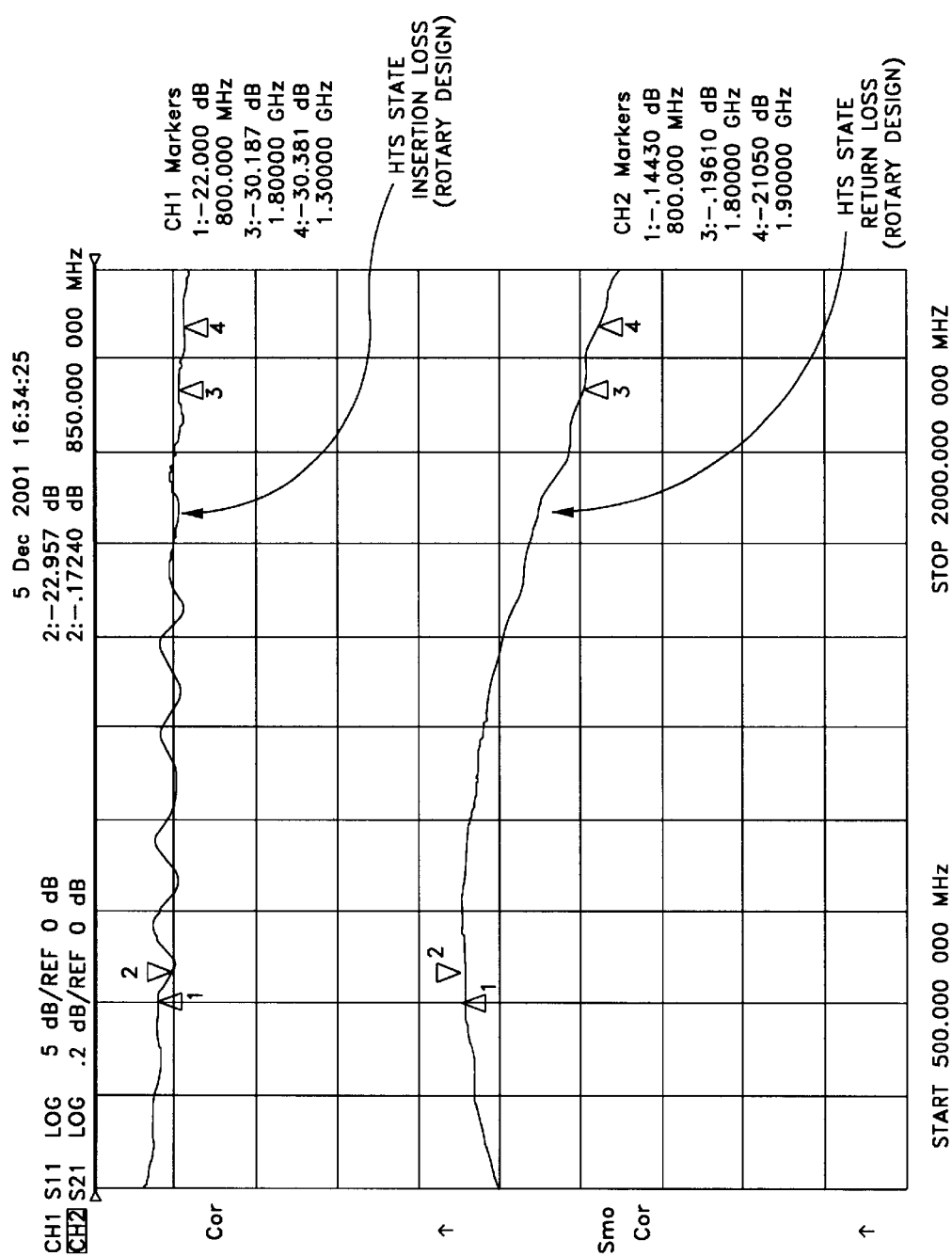
FIG. 18 is a chart of sample performance data for a rotary design of a switch according to one embodiment of the present invention in the HTS state.

Turning now to the performance characteristics of the rotary switch design, FIG. 17 is a chart illustrating sample isolation data for the rotary switch design in the HTS state, and FIG. 18 is a chart illustrating sample return loss and insertion loss data for the rotary switch design in the HTS state. In the HTS state at 800 MHz, the rotary switch may exhibit approximately a 0.14 dB insertion loss, a 23 dB return loss, and 84 dB isolation. At 1.9 GHz and in the HTS state, the rotary switch may exhibit approximately a 0.21 dB insertion loss, a 30 dB return loss, and 77 dB isolation.

Turning back to the receiver 100 shown in FIG. 1, a first switch 130 is disposed on the cryogenic enclosure 110. The first switch 130 is disposed on the cold stage 112 in FIG. 1. It should be understood, however, that the switch 130 may also be placed in any number of locations besides on the cryogenic enclosure 110, such as, e.g., on the cold stage 112, near an inner wall of the dewar, directly adjacent the outer wall of the dewar, or the like.

Figure 5:
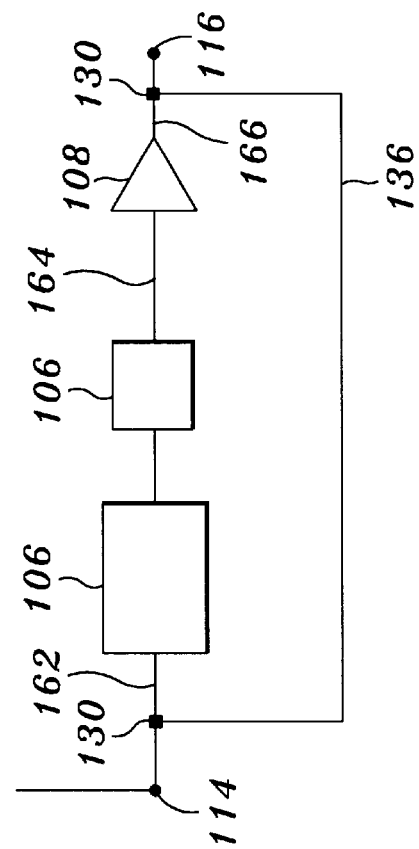
FIG. 5 is a schematic diagram of a HTS-based RF receiver having a plurality of HTS filters in series with a LNA, according to one embodiment of the present invention.
Figure 4:
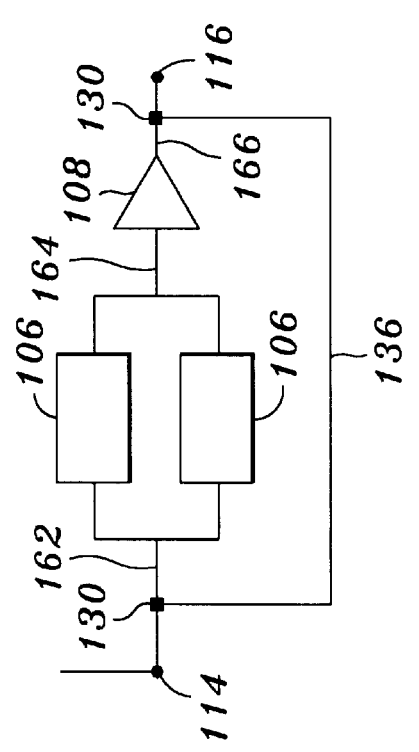
FIG. 4 is a schematic diagram of a HTS-based RF receiver having a plurality of HTS filters in parallel with a LNA, according to one embodiment of the present invention.

The first switch 130 is also connected to one or more HTS filters 106 via an input 162. In this regard, the HTS filter 106 is operatively coupled to the RF input 114 via the first switch 130. If multiple HTS filters 106 are used, the HTS filters 106 may be arranged in parallel or series as shown schematically in FIGS. 4 and 5, respectively. The HTS filters 106 typically comprise bandpass and/or band reject filters. The output 164 of the HTS filter 106 is coupled to the LNA 108. The LNA 108 includes an output 166 that is connected to a second switch 130.

As shown in FIG. 1, the second RF switch 130 may be disposed within the cryogenic enclosure 110. The second switch 130 may also be a reed-type or a rotary-type bypass switch. As with the first switch 130, it will be understood that the second switch 130 can also be disposed in any number of locations within or around the cryogenic enclosure 110, and vacuum dewar inner and outer walls. Similarly, the second switch 130 also has two stable states. The second switch 130 is coupled to the RF output 116. In this manner, the second switch 130 operatively couples the LNA 108 to the RF output 116.

Still referring to FIG. 1, the RF receiver 100 includes a bypass RF circuit 136 between the first and second switches 130. The bypass circuit 136 is advantageously located within the cryogenic enclosure 110. When the first and second switches 130 are activated to a bypass state, the RF signal from the antenna 120 is transmitted to the bypass circuit 136, i.e., the RF signal bypasses the HTS filter(s) 106 and LNA(s) 108. The bypass circuit 136 may be made of a low loss transmission line using, by way of example, a stripline, microstrip, or coaxial cable, or may be any suitable circuit or RF pathway. In certain implementations of the invention other components may be present along the bypass circuit 136. For example, a conventional, non-cryogenic front end may be placed at a point along the bypass circuit 136 to preserve gain.

FIG. 1 also shows a driver 176 that is preferably used to drive the cryocooler 104 in accordance with a controller 178. The controller 178 preferably receives one or more signals 180 corresponding to a measured parameter. The measured parameter may include, for example, the temperature of the cryogenic enclosure 110 or cold stage 112, the current of a LNA 108, or the drive condition of the cryocooler 104. These parameters are measured by one or more sensors 182 and reported to the controller 178. The controller 178 is also preferably in communication with the first and second switches 130 via control lines 174. The controller 178 is used to toggle the first and second switches 130 between states to engage or bypass the HTS filter(s) 106 and LNA(s) 108. Preferably, the controller 178 switches the RF receiver 100 into a bypass state, and directs RF signals through the bypass circuit 136, when one or more measured operating parameters are outside a pre-determined operating range. Preferably, the pre-determined operating range is stored within the controller 178 in, for example, a memory (not shown).

Monitored operating parameters of the pre-determined operating range may be either direct or inferred parameters. Direct parameters quantify the actual performance of the receiver system. Direct parameters could be receiver S parameters, noise figure, intermodulation, dropped call rate, or other base station channel statistics. Inferred parameters indicate that the supporting subsystems are working properly and proper RF performance is assumed. Inferred parameters could be system temperatures, LNA currents, cooler drive or reject temperatures. Example conditions that may fall outside the pre-determined operating range, and prompt the controller 178 to switch the RF receiver 100 into a bypass state, include: overheating of the cryocooler 104 heat rejector, power to the cryocooler 104 is not maintained (i.e., there is a loss of control on the drive circuit), the cold stage 112 temperature is not maintained (i.e., there is a loss of temperature range control), and the like.

FIG. 1 shows an embodiment in which the controller 178 for the cryocooler 104 is also used to control the first and second switches 130. In an alternative embodiment, a separate controller 179 (as shown in FIGS. 4–8) can be used to control the first and second switches 130. FIG. 1 shows controller 178 receiving signals 180 corresponding to certain measured operating parameters via sensors 182. The controller 178 may also control the cryocooler 104 using a dual-loop feedback arrangement such as that disclosed in U.S. Pat. No. 6,256,999, entitled "Temperature control of high temperature superconducting thin film filter subsystems," which is expressly incorporated by reference as if set forth fully herein. Additionally, control of the switches 130 may also be accomplished through the use of a digital signal processor. An exemplary digital signal processor suitable for use with this invention is disclosed in U.S. application Ser. No. 09/872,280, entitled "Digital signal process control of Stirling cycle cryogenic cooler drive and high temperature superconducting filter temperature control loop," which is expressly incorporated by reference as if set forth fully herein.

Possible embodiments for the RF switch 130 will now be discussed. FIGS. 2A to 2D illustrate one embodiment of the switch 130, namely a reed-type switch 130(a). The receiver shown in FIG. 2A includes a HTS circuit (not shown) within the enclosure 110. Consequently, as shown, the receiver incorporates one reed switch 130(a). In other implementations, a greater number of reed bypass switches 130(a) may be used if a greater number of circuits, and correspondingly the number of input and output paths, is included within the receiver. Each reed switch 130(a) is connected to an input and output path via a cryocable 131. One example cryocable that may be used with the present invention is disclosed in U.S. Pat. No. 5,856,768, which is expressly incorporated by reference as if set forth fully herein.

Each reed switch 130(a) includes a pair of reed arrangements 147, with one arrangement 147 each for an input path and an output path. An example reed arrangement 147 is best viewed in FIGS. 2C and 2D. Each reed arrangement 147 comprises a cantilever 132 having a magnet assembly 133 on one end. The cantilever 132 and the magnet assembly 133 may be formed at least in part from BeCu, gold plated BeCu, rhodium plated BeCu, stainless steel, or the like. Opposite the magnet assembly 133, the cantilever 132 is coupled to a cryocable 131.

The magnet assembly 133 is placed between breaks in the HTS circuit 134 and the bypass circuit 136. The bypass circuit 136 may be coupled to or integrated with a bypass lid 140. The bypass lid 140 may be, e.g., a component of the enclosure 110. As shown, the bypass circuit 136 is disposed above the cantilever 132, and more preferably above the magnet assembly 133 of the cantilever 132, while the circuit connected to the HTS circuit 134 is disposed below the cantilever 132. Alternatively, the relative positions of the circuits 136, 134 may be swapped, i.e., the bypass circuit 136 may be disposed below the cantilever 132, while the circuit connected to the HTS circuit 134 may be disposed above the cantilever 132.

Figure 2A:
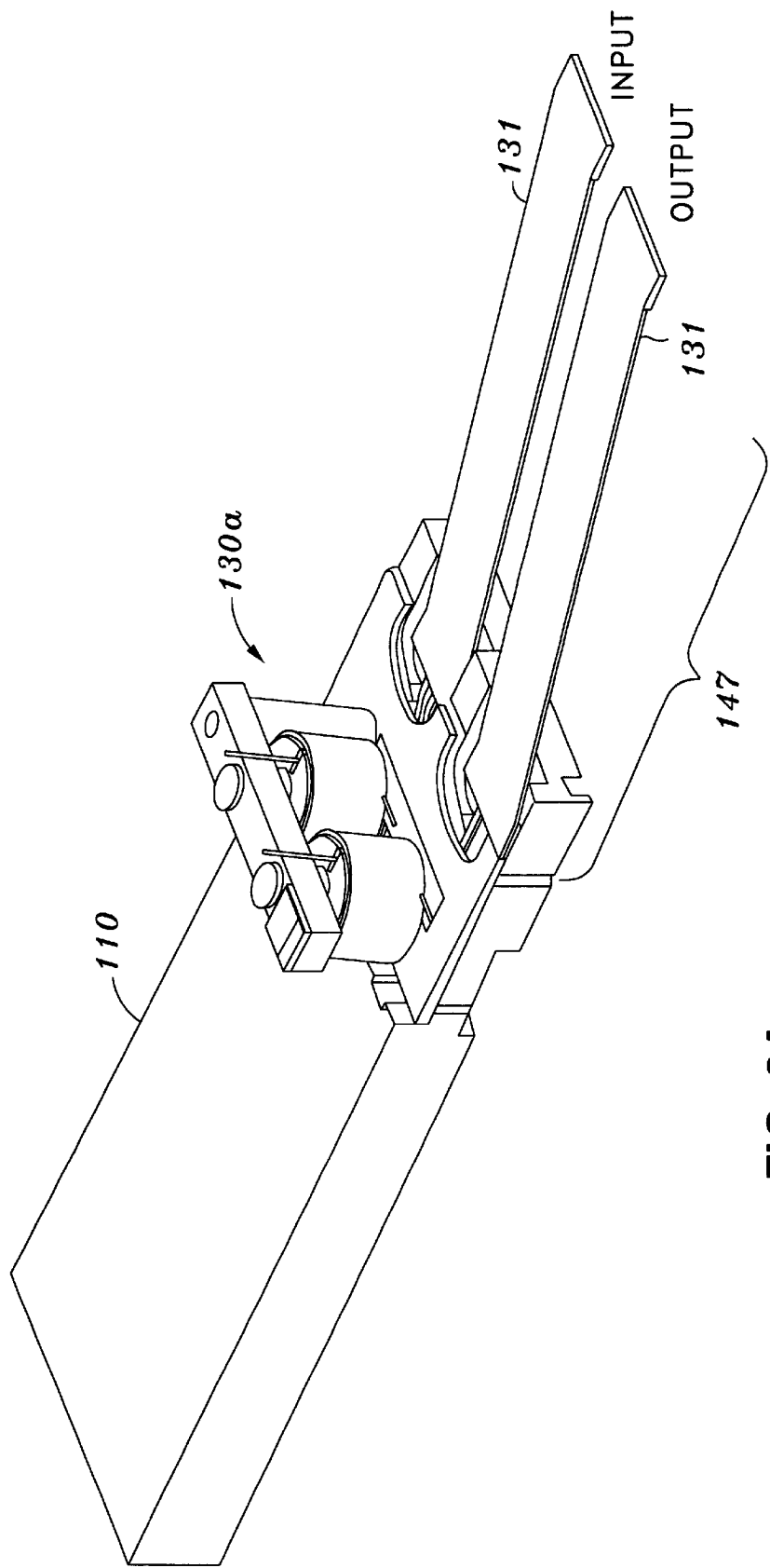
FIG. 2A illustrates a reed RF latching switch of the present invention implemented with an enclosure that may house HTS filters, LNAs, and other receiver electronics.
Figure 2B:
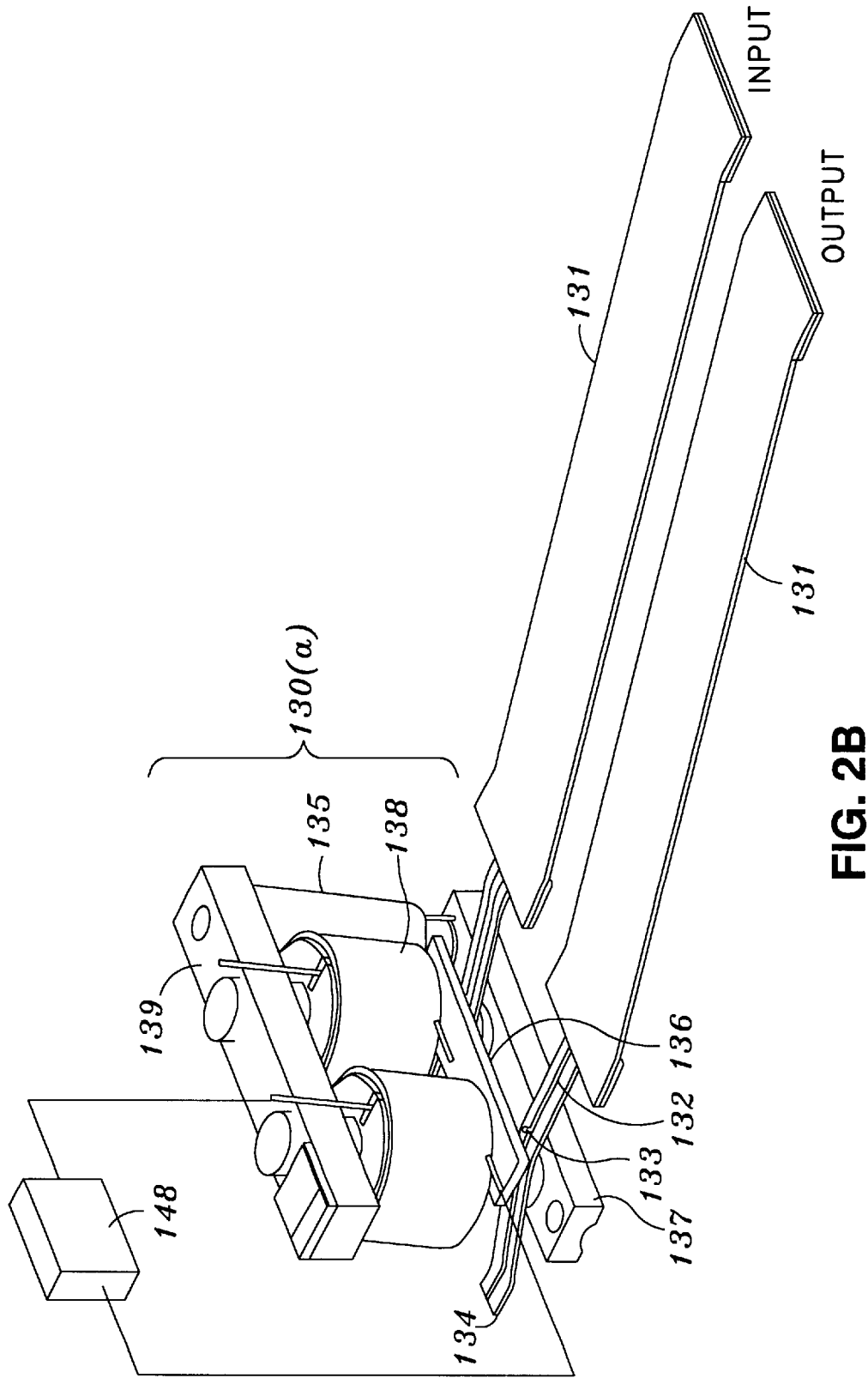
FIG. 2B illustrates a detailed view of the reed RF latching switch of FIG. 2A.
Figure 2C:
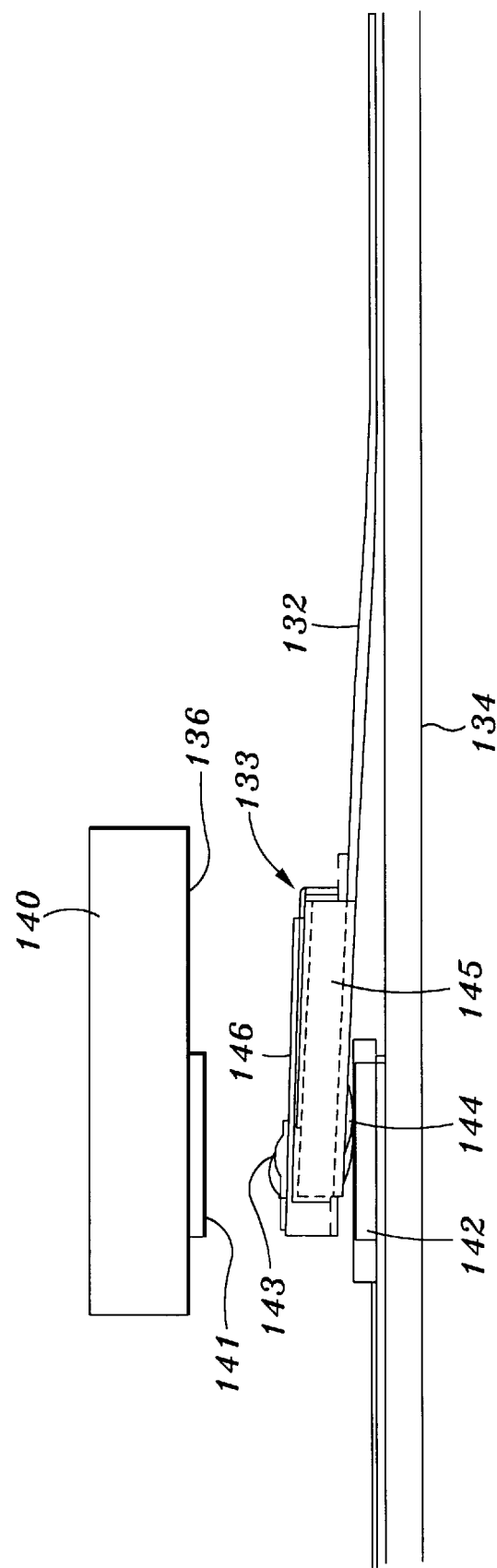
FIG. 2C illustrates a side view of a reed RF latching switch, including a fail safe circuit, according to one embodiment of the present invention.

Turning back to the illustrated embodiment, to place the reed switch 130(a) in HTS state, the reed arrangements 147 are actuated and placed in a "down" position to complete the RF path for the HTS circuit 134. To place the reed switch 130(a) in bypass state, the reed arrangements are actuated and placed in an "up" position, thereby completing the RF path for the bypass circuit 136 while simultaneously disrupting the RF path for the HTS circuit 134. As best seen in FIG. 2C, the bypass circuit 136 or bypass lid 140 may include a contact pad 141 that faces the magnet assembly 133 of the reed switch 130(a). Similarly, the circuit to the HTS RF circuit 134 may include a contact pad 142 that faces the magnet assembly 133. The contact pads 141, 142 may be formed from a ferromagnetic material such as nickel, steel, or the like, and preferably a material that is magnetic. The contact pads 141, 142 may also be plated with rhodium, gold, and the like. The magnet assembly 133 of the reed bypass switch 130(a) includes an upper contact point 143 and a lower contact point 144. When the reed switch 130(a) is in HTS state, the lower contact point 144 is coupled to the lower contact pad 142 on the circuit to the HTS circuit 134, thereby forming a complete HTS circuit. When the reed switch 130(a) is in bypass state, the upper contact point 143 is coupled to the upper contact pad 141 located on the bypass circuit 136 or bypass lid 140, thereby completing the bypass circuit 136. One skilled in the art will appreciate that the contact points 144, 143 and the contact pads 142, 141, respectively, do not necessarily have to be in direct physical contact in order to complete the respective circuits. Instead, particularly in a microwave application, the contact points 144, 143 and the contact pads 142, 141 only need to be in close enough proximity such that capacitive forces are sufficient to complete the respective circuits, and there may be a gap or a dielectric layer, for example, between the contact points 144, 143 and the contact pads 142, 141.

The contact pads 141, 142 also provide a latching mechanism for the reed switch 130(a) that maintains, i.e., latches, the reed switch 130(a) in either of the HTS or bypass positions without requiring a constant flow of electricity. For example, a magnetic field is applied to the reed switch 130(a) to transition the reed switch 130(a) to either of the HTS or the bypass states. After the reed switch 130(a) is transitioned to either of the HTS or the bypass states, the electric flow, and correspondingly the magnetic flux, is ceased. Because the pads 141, 142 are made of ferromagnetic material, the pads 141, 142 magnetically latch the magnet assembly 133 to a given position, and maintains the reed arrangement 147 in that position without requiring a constant flow of electromagnetic current. Therefore, an electromagnetic current is only applied to the reed switch 130(a) when it is desired to transition the reed switch 130(a) between the HTS and bypass states. It is unnecessary to continuously apply power to the reed switch 130(a) to maintain it in either of the HTS or bypass states after the reed switch 130(a) is placed in one of the states.

To actuate each reed arrangement 147, an electromagnetic assembly may be provided that applies an electromagnetic field to move the magnet assembly 133 on the switch 130(a), depending on whether the receiver 100 is operated in the bypass or HTS state, respectively. The electromagnetic assembly may include a coil assembly 138, an upper core 139, a mid core 135, and a lower core 137. The upper core, mid core and lower core parts are preferably made of a ferromagnetic material such as, e.g., nickel or steel. As best seen in FIG. 2B, in one embodiment of the electromagnetic assembly, the coil assembly 138 is coupled to and located above the bypass circuit 136. The upper return core 139 is coupled to and disposed through the coil assembly 138 and located above the bypass circuit 136. Additionally, the mid core 135 is coupled to both the upper return core 139 and the lower return core 137, which is coupled to and disposed below the HTS circuit 134. The electromagnetic assembly may be coupled to a suitable power source (not shown) and ground (not shown). By applying an electrical current, from the power source, to the coil assembly 138, the coil assembly 138 generates an electromagnetic field. The electromagnetic field travels through the cores 139, 135, 137, concentrating the magnetic field in the vicinity of the magnet assembly 133 on the end of the cantilever 132. Depending on the direction of travel of the electromagnetic field, or the direction of travel of the magnetic flux, the reed arrangement 147 is either transitioned to the HTS state or to the bypass state. Accordingly, the direction of the electromagnetic field is manipulated in order to transition the switch 130(a). This is in contrast, for example, to varying the polarity of the cantilever 132 itself in order to operate the switch 130(a).

Additionally, in the event of power failure, a fail safe circuitry 148 is provided to transition the reed switch 130(a) between the HTS and bypass states when there is a disruption in power. Such a disruption may, for example, cause the electromagnetic assembly to become inoperable. As shown in FIG. 2B, the fail safe circuitry 148 may be coupled to the coil assembly 138, to generate an electromagnetic field in the event of a disruption in power. The circuitry 148 maintains a level of energy that is discharged when the power available to the reed switch 130(a) falls below a predetermined level, i.e., a level indicative of a power failure, such as those previously identified. When the fail safe circuitry 148 is discharged, an electromagnetic field is created that transitions the reed switch 130(a) between the HTS and bypass states. In one embodiment, the fail safe circuitry 148 may include a capacitor or battery.

Figure 2D:
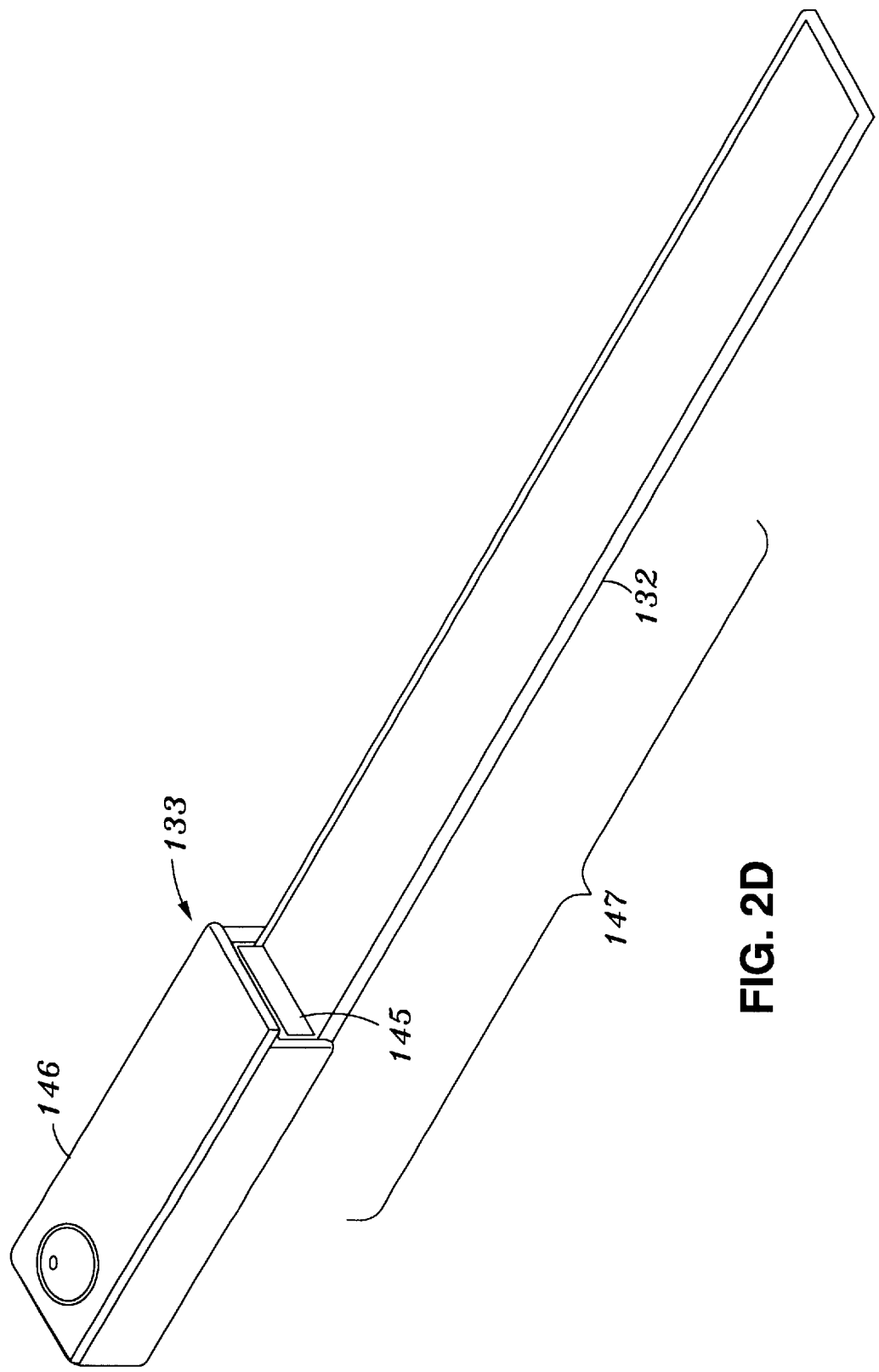
FIG. 2D illustrates a reed arrangement of a reed RF latching switch according to one embodiment of the present invention.

FIG. 2D provides a cut-away view of the magnet assembly 133 of the reed switch 130(a). A magnet 145 is disposed at one end of the cantilever 132. Additionally, a magnet housing 146 is crimped, molded, or otherwise formed over the magnet 145. The magnet housing 146 may be manufactured from the same material as the cantilever 132, i.e., the magnet housing 146 may be formed from BeCu, rhodium plated BeCu, gold plated BeCu, gold plated stainless steel or the like.

Figure 2E:
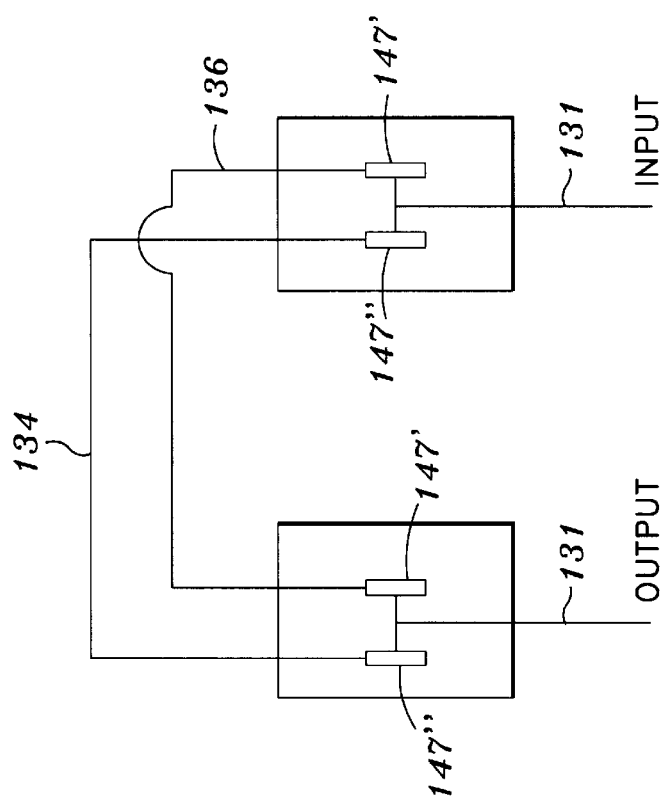
FIG. 2E is a schematic illustration of a reed RF latching switch according to one embodiment of the present invention that is used as a single pole double throw (SPDT) switch.

FIG. 2E is a schematic diagram of another implementation of the reed switch 130(a), namely the use of the reed switch 136(a) as a SPDT switch. Here, each separate reed arrangement 147 functions as a individual SPDT switch. Each reed arrangement 147 is coupled to either a HTS RF circuit 134 or a bypass circuit 136. As illustrated, each reed arrangement 147' is coupled to the bypass circuit 136, and each reed arrangement 147" is coupled to the HTS RF circuit 134. A cryocable 131 is coupled to the reed arrangements 147', 147" and provides a connection between the reed arrangements 147', 147" and output and input lines. Each reed arrangement 147', 147" operates in substantially the same manner as previously discussed with regard to reed arrangement 147 and the reed switch 130(a) generally, and reference is made to that discussion as it applies to the embodiment shown in FIG. 2E.

FIGS. 3A to 3D illustrate another embodiment of a RF switch 130 of the present invention switch, namely, a rotary switch 130(b). Generally, the rotary switch 130(b) is coupled to a stationary RF circuit substrate 228 having at least two RF paths, one for a HTS state/path and one for a bypass state/path, with breaks in the paths. A circular hole is formed in the circuit substrate 228, such as, e.g., in a central area of the circuit substrate 228, through which an elongated member or rod 204 may be inserted. The circular hole provides a pivot point for a rotor structure, which may include a dielectric rotor 202. Additionally, cryocables 229 are coupled to input and output paths of the circuit substrate 228.

Figure 3A:
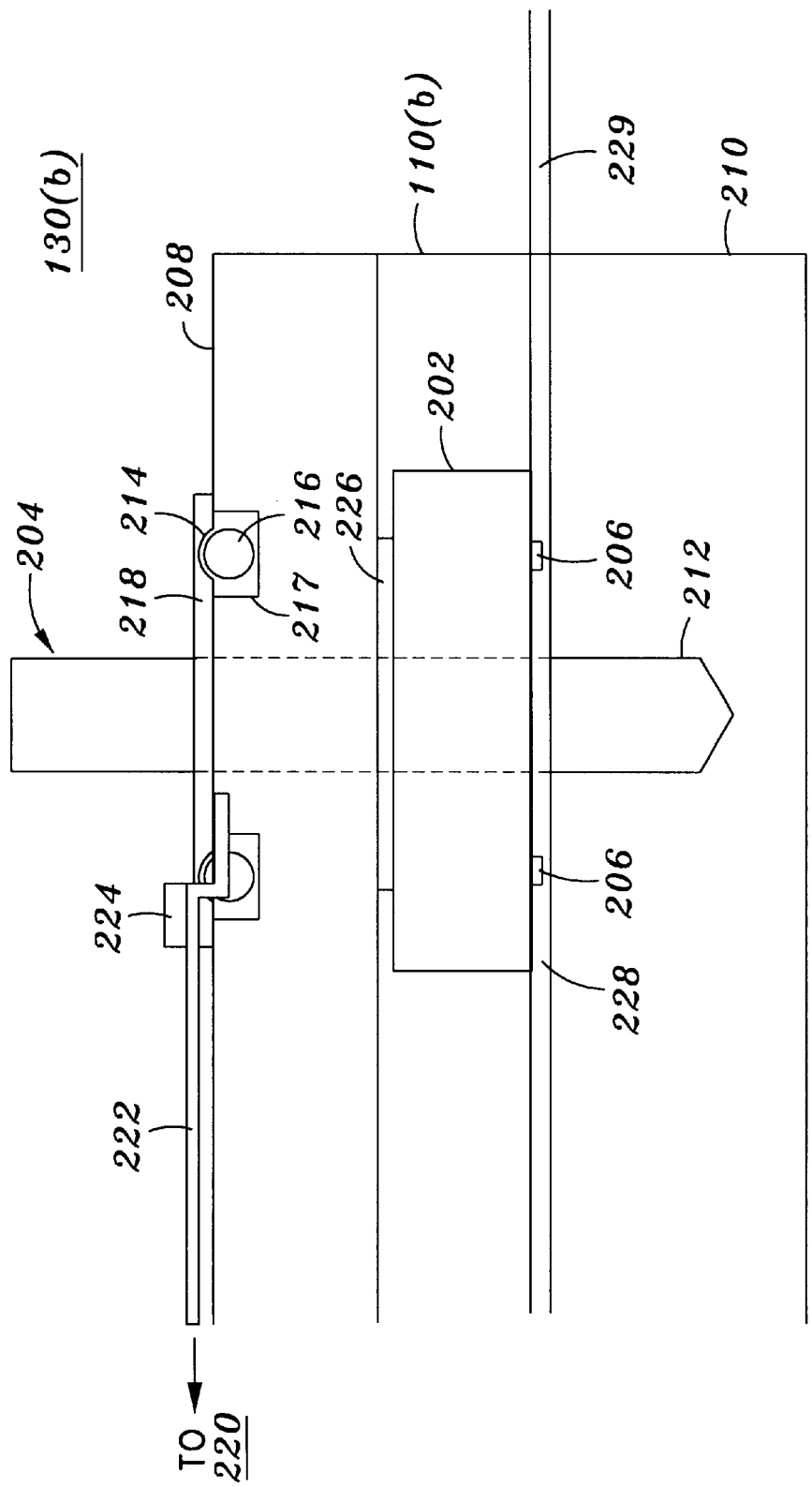
FIG. 3A is a side view, schematic illustration of a rotary RF switch according to one embodiment of the present invention.

Turning now to FIG. 3A, a cross-section of the rotary bypass switch 130(b) is illustrated. The rotary bypass switch 130(b) includes a dielectric rotor 202 coupled to an elongated member or rod 204, which may be disposed substantially through a centrally located opening 205 (best seen in FIGS. 3B and 3C) within the dielectric rotor 202. The dielectric rotor 202 may be located within or on the outer surface of a cryogenic enclosure 110(b). The enclosure 110(b) is similar to the previously discussed enclosure 110 in that enclosure 110(b) is also designed to house the HTS filter(s) 106 and low noise amplifier(s) LNA(s) 108, and possibly other electronic components of a receiver 100. The enclosure 110(b) includes a cover 208 and a bottom 210. Preferably, the cover 208 and the bottom 210 include openings through which the rod 204 of the rotary bypass switch 130(b) may be inserted. As best illustrated in FIG. 3A, the rod 204 is preferably disposed through both the enclosure 110(b) and the dielectric rotor 202, with a portion of the rod 204 exposed above enclosure 110(b), i.e., above the cover 208, and an end 212 of the rod 204 disposed within the bottom 210 of the enclosure 110(b). The end 212 of the rod 204 may be tapered to facilitate the pivoting or rotation of the dielectric rotor 202.

Figure 3C:
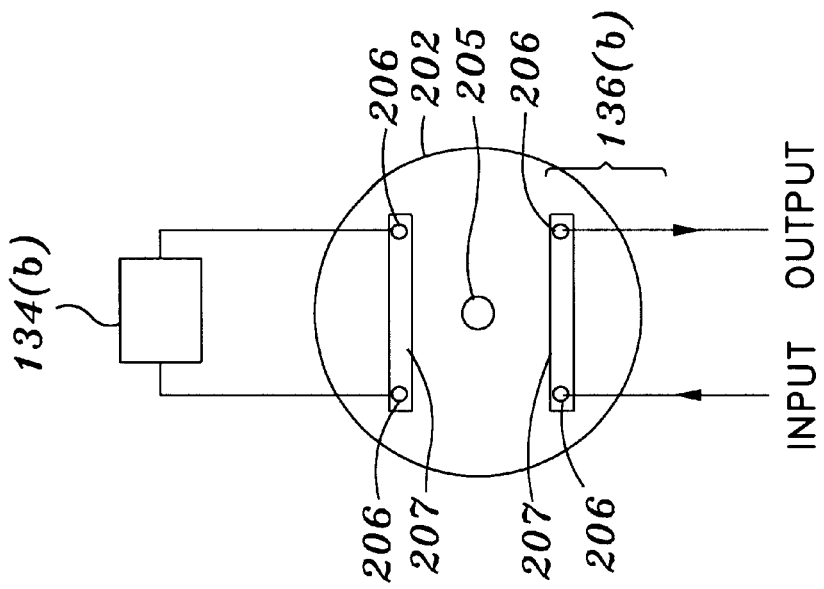
FIG. 3C is a schematic view of a rotary RF switch, according to one embodiment of the present invention, in bypass state.
Figure 3B:
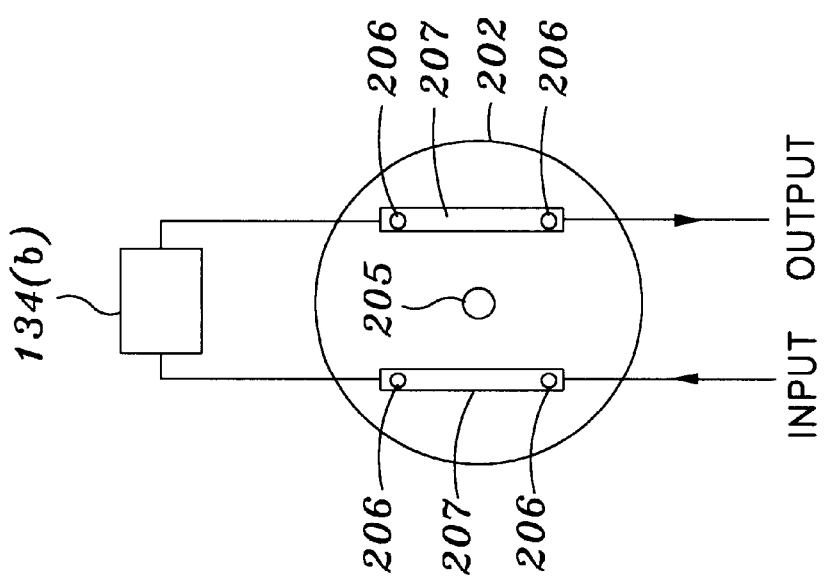
FIG. 3B is a schematic view of a rotary RF switch, according to one embodiment of the present invention, in HTS state.

RF contacts 206, which may be disposed on strips 207 (best seen in FIGS. 3B and 3C), are provided on the underside of the dielectric rotor 202. The RF contacts 206 may be formed from, e.g., rhodium plated BeCu, BeCu, gold plated BeCu, gold plated stainless steel or the like. The RF contacts 206 provide a bridge to connect the breaks in the stationary RF circuit paths. Turning to FIGS. 3B and 3C, when the dielectric rotor 202 is displaced a predetermined number of degrees, which in this case is 90°, the RF contacts 206 bridge to complete either the HTS or the bypass path. For example, as shown in FIG. 3B, when the dielectric rotor 202 is placed in a first position, the RF contacts 206, which are shown as being disposed on strips 207, span a break within a HTS circuit 134(b), thereby completing the HTS circuit 134(b) and placing the rotary bypass switch 130(b) in HTS state. In FIG. 3C, by comparison, the dielectric rotor 202 is rotated 90°. As a result, the RF contacts 206 no longer complete the HTS circuit 134(b). Instead, a bypass circuit 136(b) is formed, and RF signals are not sent through the HTS circuit 134(b). Here, the rotary switch 130(b) is in bypass state.

Figure 3D:
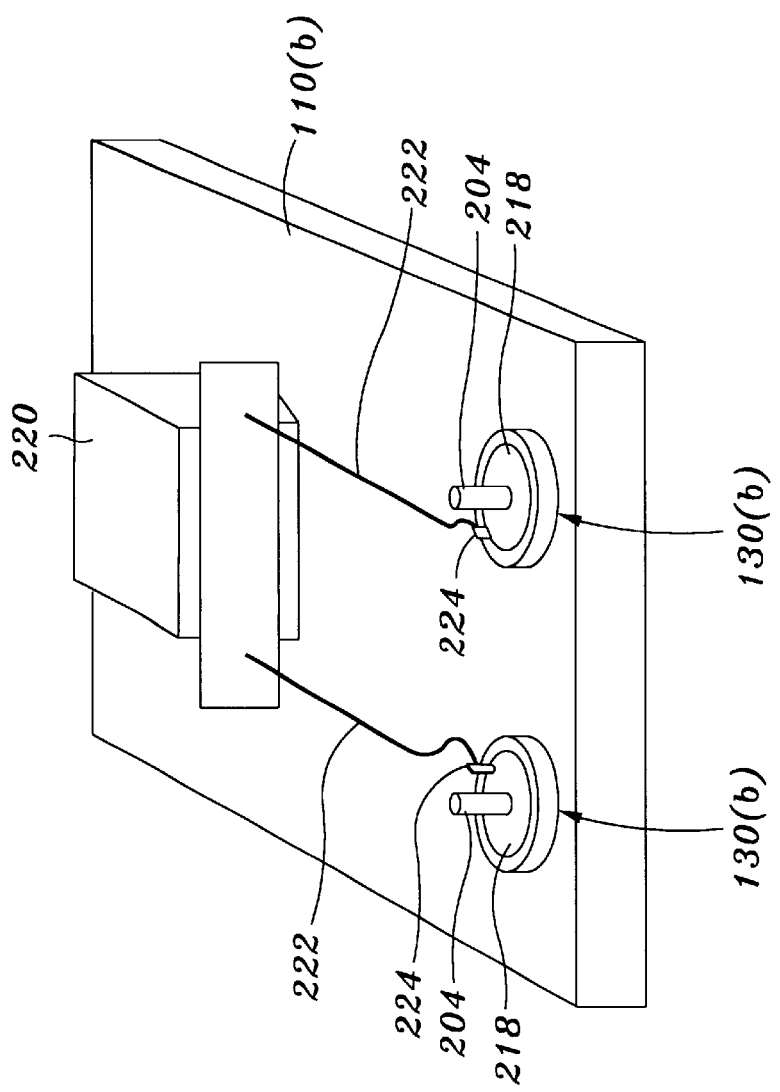
FIG. 3D illustrates two rotary RF switches according to the present invention incorporated into the cryogenic enclosure of a RF receiver and coupled to a linear actuator.

Rotation of the rotary switch 130(b) may be accomplished through various designs. Shown in FIG. 3D is an embodiment that uses a linear actuator 220 to rotate the rotary switch 130(b). Although not shown, a rotary actuator may also be used to rotate the rotary switch 130(b). The receiver shown in FIG. 3D includes two sets of RF input and output paths, and therefore includes two rotary switches 130(b). It will be appreciated, however, that receivers may be implemented that include a smaller or greater number of rotary switches 130(b), depending on the number of sets of input and output RF paths.

As best illustrated in FIG. 3A, the rotary switch 130(b) may incorporate a plurality of openings 214 on the lower surface of the disk 218 of the enclosure 110(b). Each opening 214 is configured to slidably engage one of a plurality of ball bearings 216 that are coupled to an outer surface of the cover 208. For example, each ball bearing 216 may sit within a pocket 217 on the outer surface of the cover 208. The disk 218 may be, e.g., a teflon coated aluminum disk. The disk 218, in turn, may be coupled to the linear actuator 220 via a mechanical linkage 222. As previously noted, the linear actuator 220 itself is best seen in FIG. 3D. The linear actuator 220, which may be connected to, or incorporate, a rack and pinion gear assembly, enables linear motion to be converted to rotary motion. The disk 218 may include a protrusion 224 suitable for coupling with the linkage 222 that enables the linear actuator 220 to exert rotational force on the disk 218.

To further facilitate movement or rotation of the dielectric rotor 202, a light spring loaded wave washer 226 is provided. The spring washer 226 is preferably positioned between the cover 208 and the top surface of the dielectric rotor 202. As the disk 218 is rotated over the ball bearings 216, the spring washer 226 compresses, thereby facilitating the movement of the entire disk 218 up and over the ball bearings 216. Lifting the disk 218 results in a corresponding lifting motion of the rod 204, dielectric rotor 202, and the RF contacts 206 on the underside of the dielectric rotor 202. Lifting the RF contacts 206 during the rotational movement, which may be, e.g., about a 90° rotation, ensures that the RF contacts 206 are not dragged across the stationary RF circuit substrate 228, thereby avoiding frictional damage to the circuit substrate 228 during the transition between HTS and bypass states.

As noted, the RF switch 130, which may be either the reed switch 130(a) or the rotary switch 130(b), is operable in non-HTS applications. For non-HTS applications, such as, e.g., applications using receivers that incorporate a non-HTS filter, the RF switch 130 transitions between a RF filtering active circuit and a bypass circuit in a similar manner to the previously discussed transitions between HTS circuits and bypass circuits. The RF filtering active circuit would, for example, direct RF signals to the RF filter, while the bypass circuit would direct RF signals around the RF filter. Additionally, the RF switch 130 of the present invention, i.e., reed switch 130(a) and/or rotary switch 130(b), may also be used in non-bypass switch applications. For example, the switch 130 may be used in place of any commercially available SPDT switch or any conventional transfer switch. A single reed arrangement 147 of a reed switch 130(a) may, e.g., function as a SPDT in place of any conventional SPDT switch.

Figure 6:
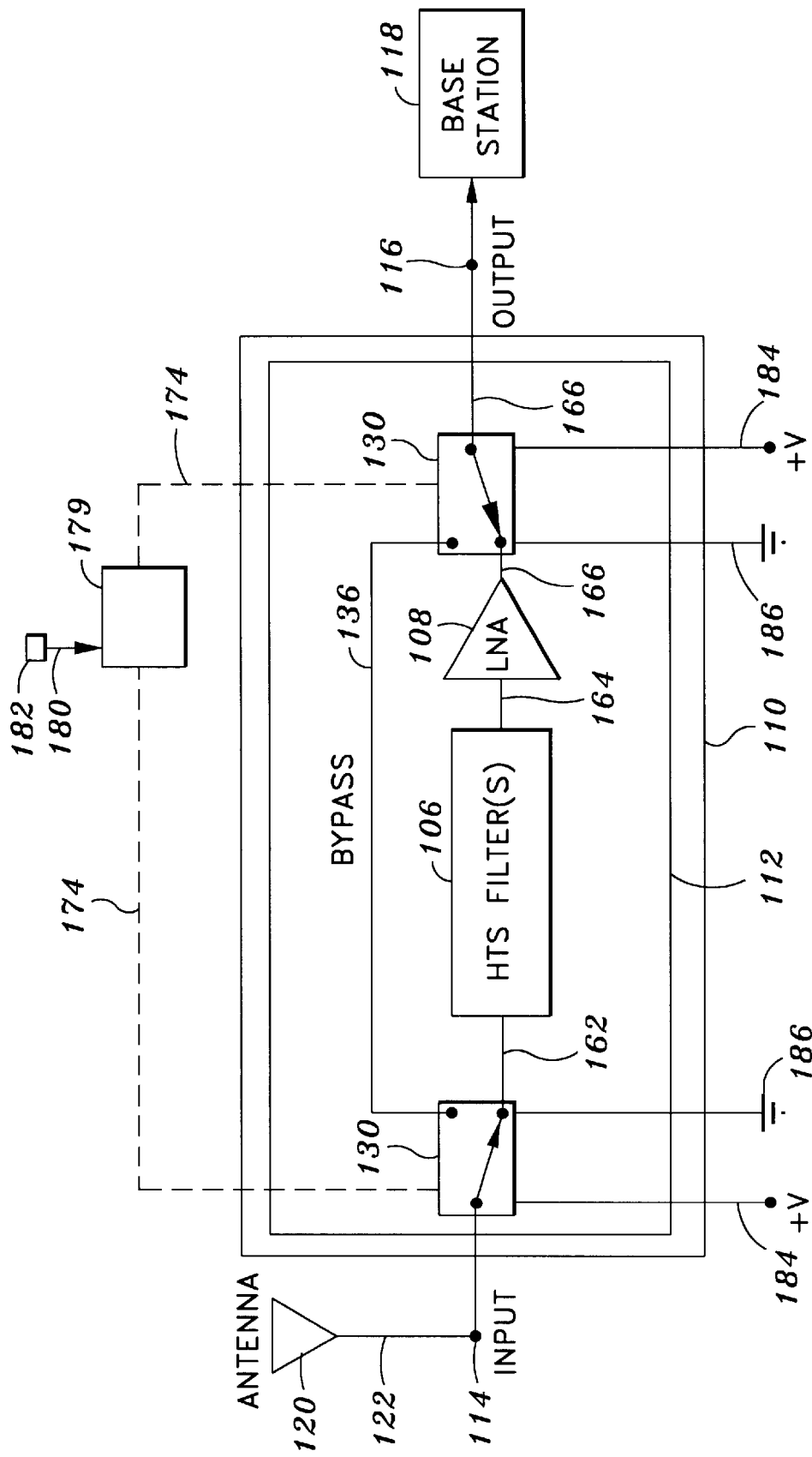
FIG. 6 is a schematic diagram of a HTS-based RF receiver having first and second RF switches located within the cryogenic enclosure, according to an embodiment of the present invention. The first RF switch is disposed upstream of the HTS filter, while the second RF switch is disposed downstream of the LNA.

Various different arrangements of switches 130 within a HTS-based application will now be described. FIG. 6 is a schematic diagram of an embodiment of a HTS-based receiver 100, and a detailed view of the cold stage 112 and first and second switches 130 of the receiver 100. As used herein, references to a switch 130 applies equally to the reed switch 130(a) and rotary switch 130(b) embodiments. The first and second switches 130 are disposed on the cryogenic enclosure 110, coupled to the cold stage 112, within the vacuum dewar. The first and second switches 130 are connected to a separate controller 179. The controller 179 preferably receives one or more signals 180 corresponding to a measured parameter such as the temperature of the cryogenic enclosure 110 or cold stage 112, the current of one or more LNAs 108, or the drive condition of the cryocooler 104. The first and second switches 130 are also connected to a power line 184 and ground 186. The power line 184 preferably connects to a DC source (not shown) in order to power the switches 130 as needed. The remaining aspects of this embodiment are the same as those described with respect to FIG. 1.

Figure 7:
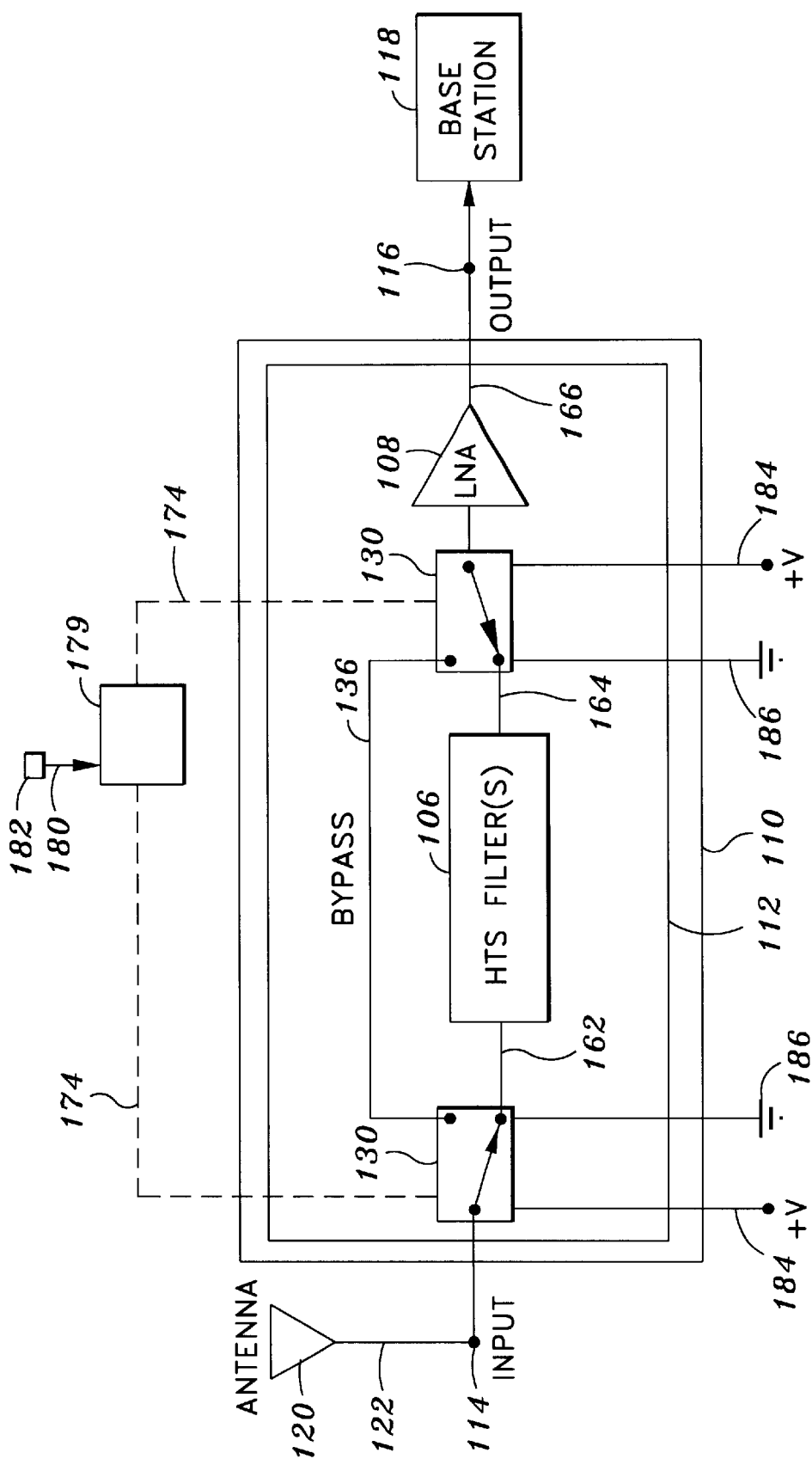
FIG. 7 is a schematic diagram of a HTS-based RF receiver having first and second RF switches located within the cryogenic enclosure, according to another embodiment of the present invention. In this embodiment, the second RF switch is disposed upstream of the LNA and downstream of the HTS filter.

FIG. 7 schematically illustrates an another embodiment of a HTS-based receiver 100. In this embodiment, the second switch 130 is located after the HTS filter 106 but prior to the LNA 108. The HTS filter 106 is thus operatively coupled to the LNA 108 via the second switch 130. The output 166 of the LNA 108 is coupled to the RF output 116. The remaining aspects of the RF receiver 100 shown in FIG. 7 are identical to those described with respect to the embodiment shown in FIG. 6.

Figure 8:
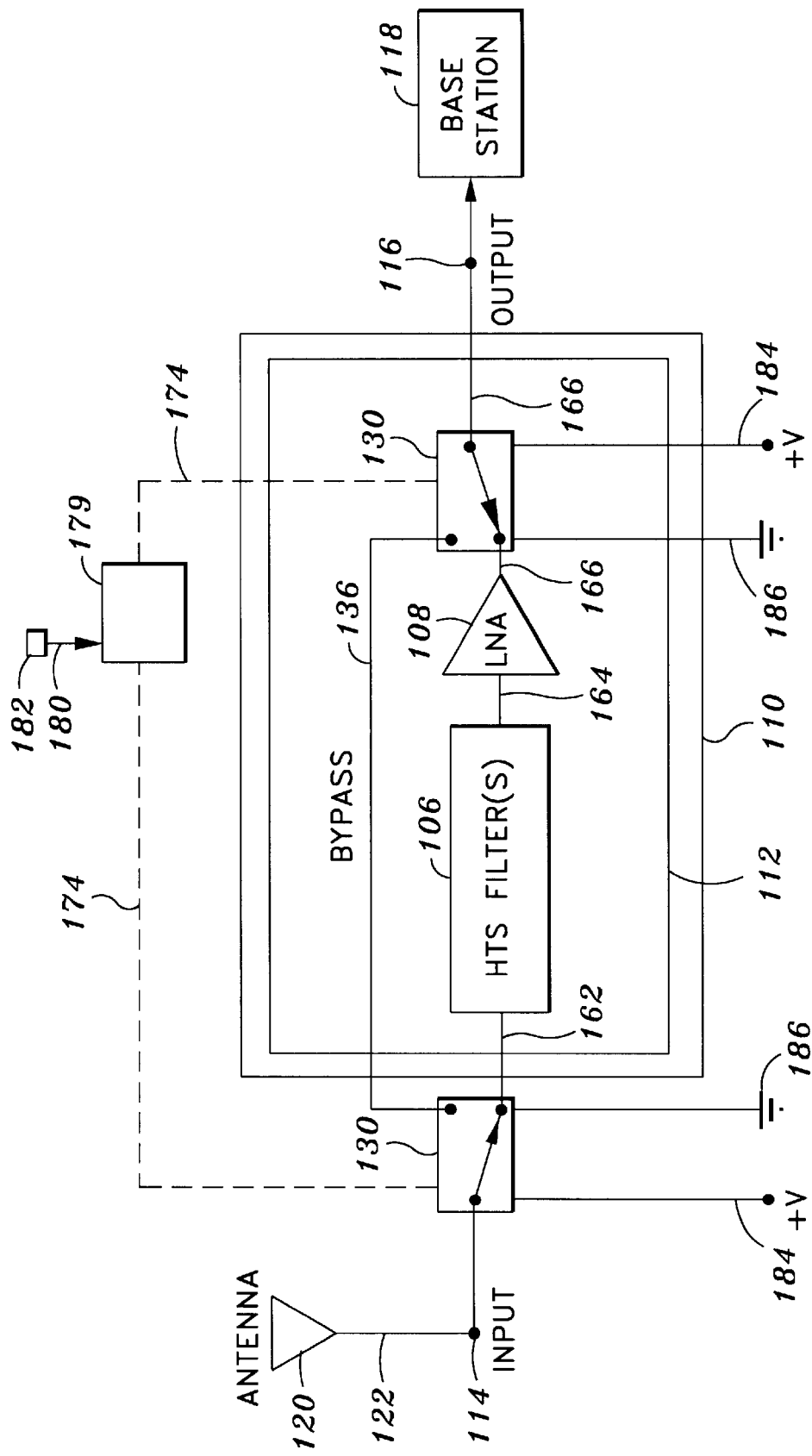
FIG. 8 is a schematic diagram of a HTS-based RF receiver having the first RF switch located outside of the cryogenic enclosure and the second RF switch located inside the enclosure, according to another embodiment of the present invention. The first RF switch is disposed upstream of the HTS filter, while the second RF switch is disposed downstream of the LNA.

FIG. 8 schematically illustrates yet another embodiment of a HTS-based RF receiver 100, wherein the first switch 130 is located outside the vacuum dewar. The second switch 130 is located within the vacuum dewar. The remaining aspects of this embodiment are identical to those found in the embodiment shown in FIG. 6 and described in detail above.

Figure 9:
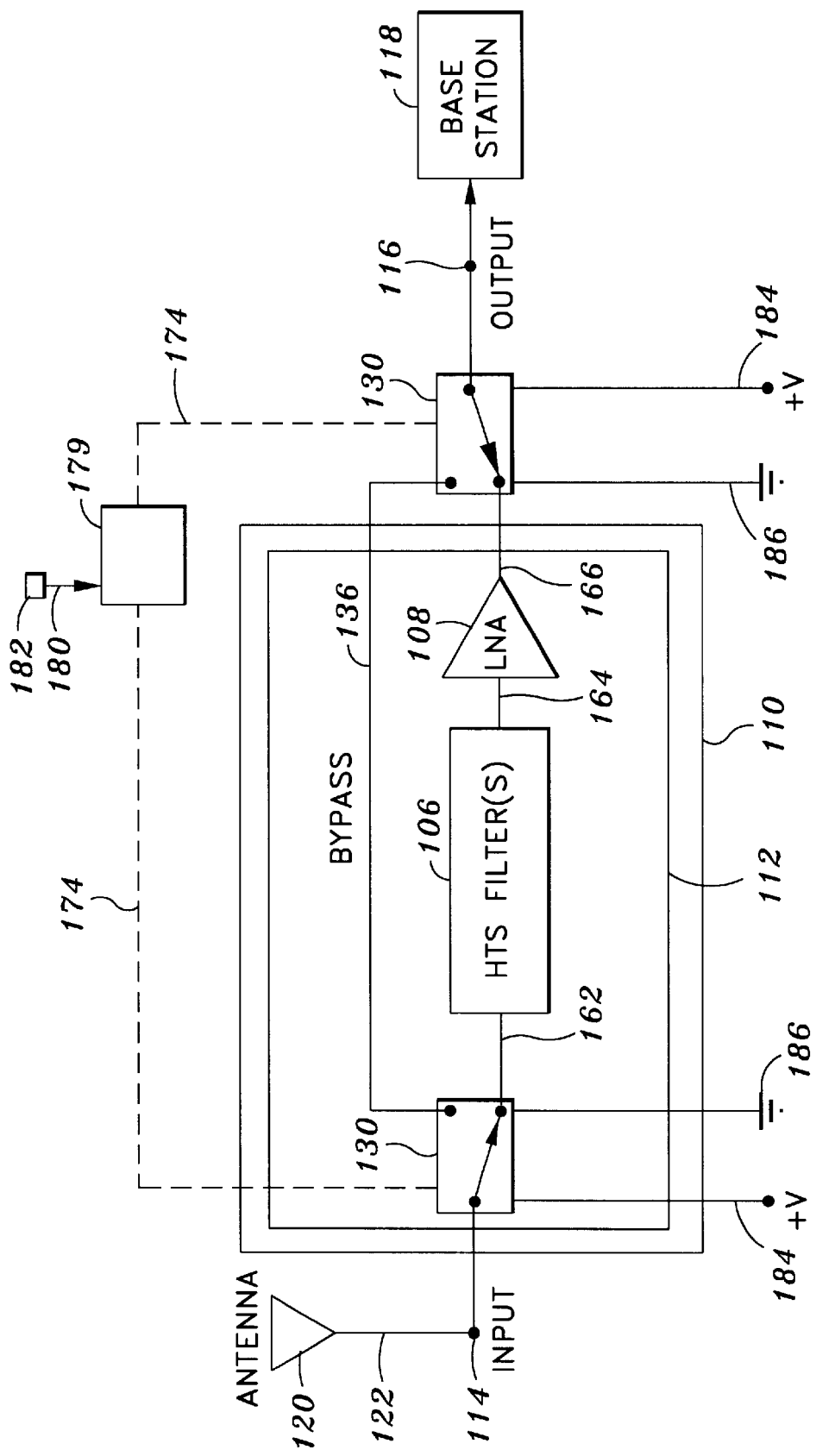
FIG. 9 is a schematic diagram of a HTS-based RF receiver having the first RF switch located inside the cryogenic enclosure and the second RF switch located outside the cryogenic enclosure, according to another embodiment of the present invention. The first RF switch is disposed upstream of the HTS filter, while the second RF switch is disposed downstream of the LNA.

FIG. 9 schematically illustrates still another embodiment of a HTS-based receiver 100. Here, the second switch 130 is located outside the vacuum dewar. The first switch 130 is located on cryogenic enclosure 110, coupled to the cold stage 112, within the vacuum dewar. The remaining aspects of this embodiment are identical to those found in the embodiment shown in FIG. 6 and described in detail above.

Figure 10:
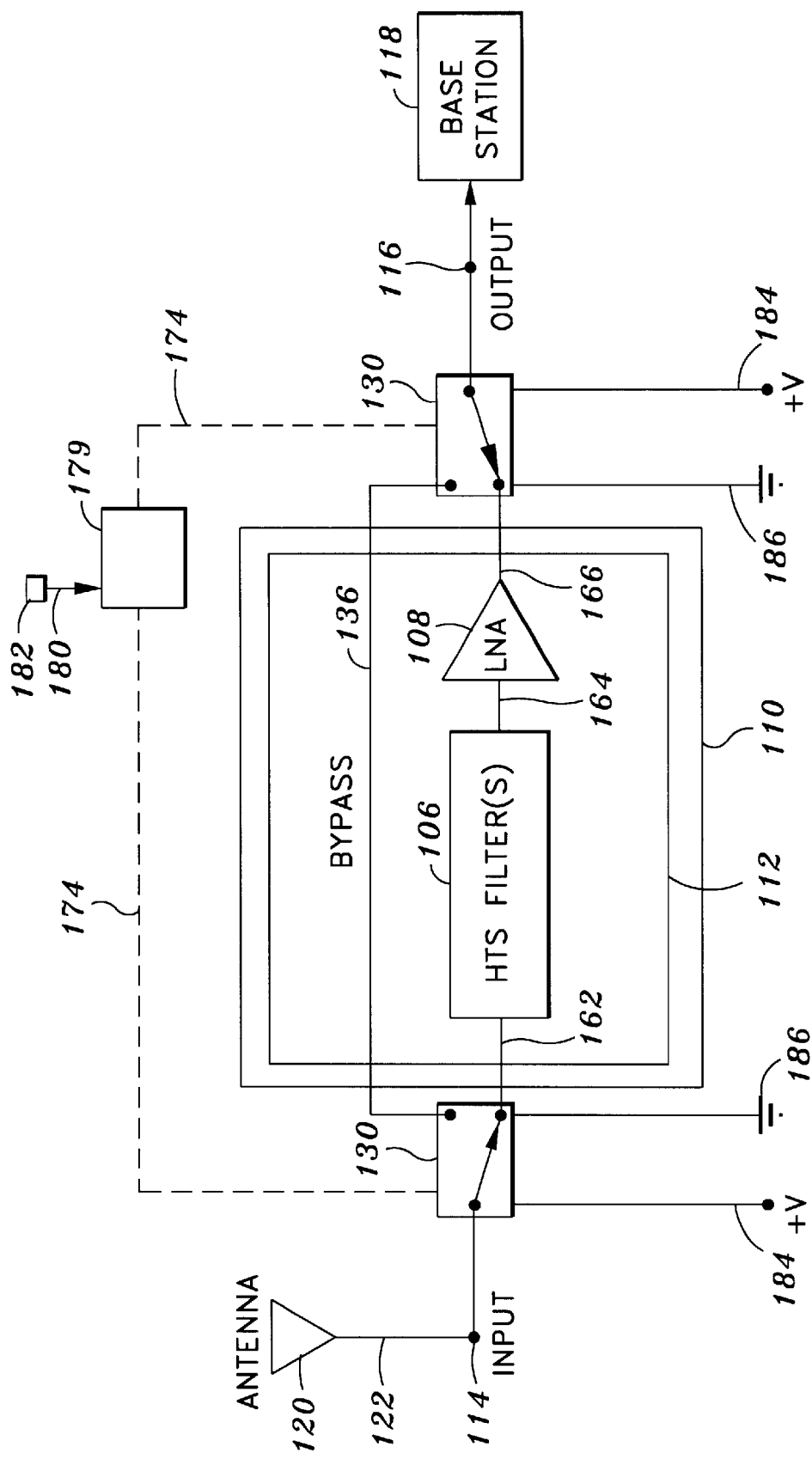
FIG. 10 is a schematic diagram of a HTS-based RF receiver having the first and second RF switches located outside the cryogenic enclosure, according to one embodiment of the present invention. The first RF switch is disposed upstream of the HTS filter, while the second RF switch is disposed downstream of the LNA.

FIG. 10 illustrates still another embodiment of a HTS-based receiver 100. In this embodiment, the first switch 130 and second switch 130 are both located outside the vacuum dewar. In addition, the bypass circuit 136 is also located outside the vacuum dewar. The remaining aspects of this embodiment are identical to those found in the embodiment shown in FIG. 6 and described in detail above.

FIG. 11 illustrates a tower 190 that contains a plurality of antennas 120 (typically six) that is used for uplinks and downlinks in wireless networks. FIG. 11 shows two alternative configurations for the RF receiver 100. In one configuration, the RF receiver 100 is mounted atop a tower 190. A transmission line 192 connects the output of the RF receiver 100 to the base station 118 located at the base of the tower 190. Alternatively, the RF receiver 100 may be mounted at the base of the antenna tower 190 at substantially ground level. In this regard the RF receiver 100 may be mounted externally or internally on the walls or other structure of the base station 118, or internally rack-mounted, i.e., mounted near the base of the tower 190 in an electronics rack (not shown). This embodiment is shown by the dashed lines in FIG. 11. The electronics rack may also be located within the base station 118. In the rack-mounted (or other) embodiments described above, a low loss transmission line 192 is preferably used to connect the antennas 120 to the HTS receiver 100.

As seen in FIG. 12, the present invention may include a plurality of RF inputs 114 for a single RF receiver 100. For example, the cold stage 112 of the cryocooler 104 may contain a plurality of HTS filters 106 and LNAs 108, with several separate pathways for each antenna 120. Similarly, the RF receiver 100 may include a plurality of corresponding RF outputs 116. For each set of an input path 114 and an output path 116, a first and second bypass switch 130 is provided.

In addition to the above-mentioned implementations of the switches of the present invention, one skilled in the art would also appreciate that the switches of the present invention are usable in other cryogenic front ends and RF systems, such as, e.g., those discussed in U.S. Pat. No. 6,104,934 to Patton et al., and U.S. Pat. No. 6,205,340 to Yandrofski et al., RF systems produced by K&L Microwave (Salisbury, Md.), and cryogenic systems developed by the Research Centre Jülich (Jülich, Germany).

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. A RF magnetic latching switch having a first state and a second state, the switch comprising:
    a first switch assembly comprising an elongate member and a magnet on an end of the elongate member, the magnet being disposed between a ferromagnetic contact pad for a first circuit and a ferromagnetic contact pad for a second circuit,
    a second switch assembly comprising an elongate member and a magnet on an end of the elongate member, the magnet being disposed between a ferromagnetic contact pad for the first circuit and a ferromagnetic contact pad for the second circuit,
    an electromagnetic field source configured to transition the switch between the first and second states, and
    a fail safe circuit coupled to the electromagnetic field source and configured to transition the switch between the first and second states when the electromagnetic field source is inoperable.

2. The switch of claim 1, wherein in the first state the magnet of each switch assembly is coupled to the ferromagnetic contact pad for the first circuit, and in the second state the magnet of each switch assembly is coupled to the ferromagnetic contact pad for the second circuit.

3. The switch of claim 1, wherein the switch is transitioned between the first and second states by application of an electromagnetic field from the electromagnetic field source.

4. The switch of claim 1, wherein the switch is maintained by magnetic attraction in either the first or second states without a constant application of an electromagnetic field from the electromagnetic field source.

5. The switch of claim 1, wherein the electromagnetic field source comprises a coil assembly, a lower return core, an upper return core, and a mid core, the electromagnetic field source configured to generate an electromagnetic flux travelling in a first direction to transition the switch to the first state, and to generate an electromagnetic flux travelling in a second direction to transition the switch to the second state.

6. The switch of claim 1, wherein the fail safe circuit provides an electromagnetic discharge to transition the switch between the first and second states.

7. The switch of claim 1, wherein the fail safe circuit comprises a capacitor.

8. The switch of claim 1, wherein the fail safe circuit comprises a battery.

9. The switch of claim 1, wherein each switch assembly comprises BeCu.

10. The switch of claim 1, wherein each switch assembly comprises steel.

11. The switch of claim 1, wherein each switch assembly comprises rhodium.

12. The switch of claim 1, wherein each switch assembly is coupled to a cryocable.

13. The switch of claim 1, comprising a magnet housing surrounding each magnet of the first and second switch assemblies.

14. The switch of claim 1, wherein the first circuit is a circuit coupled to a HTS circuit and the second circuit is a bypass circuit.

15. The switch of claim 1, wherein the first state is a HTS state, and the second state is a bypass state.

16. The switch of claim 15, wherein in HTS state, the switch operates with an insertion loss of about 0.13 dB to 0.20 dB.

17. The switch of claim 15, wherein in HTS state, the switch operates with a return loss of about 25 dB to 28 dB.

18. The switch of claim 15, wherein in HTS state, the switch operates with an isolation of about 77 dB to 88 dB.

19. The switch of claim 15, wherein in bypass state, the switch operates with an insertion loss of about 0.23 dB to 0.46 dB.

20. The switch of claim 15, wherein in bypass state, the switch operates with a return loss of about 16 dB to 34 dB.

21. The switch of claim 1, further comprising first and second contact points on the first switch assembly, and first and second contact points on the second switch assembly, wherein the first contact points are coupled with the contact pads of the first circuit in the first state, and the second contact points are coupled with the contact pads of the second circuit in the second state.

22. The switch of claim 1, wherein the ferromagnetic contact pads further comprise a material selected from the group consisting of rhodium and gold.

23. A RF magnetic latching switch having a first state and a second state, the switch comprising:
   an elongate member formed from a material selected from the group consisting of BeCu, rhodium plated BeCu, gold plated BeCu, gold plated stainless steel, and stainless steel,
   a magnet disposed on an end of the elongate member, the magnet being disposed between a ferromagnetic contact pad for a first circuit and a ferromagnetic contact pad for a second circuit, and
   an electromagnetic field source configured to transition the switch between the first and second states.

24. The switch of claim 23, wherein in the first state the magnet is coupled to the ferromagnetic contact pad for the first circuit, and in the second state the magnet is coupled to the ferromagnetic contact pad for the second circuit.

25. The switch of claim 23, wherein the switch is transitioned between the first and second states by application of an electromagnetic field from the electromagnetic field source.

26. The switch of claim 23, wherein the switch is maintained by magnetic attraction in either the first or second states without a constant application of an electromagnetic field from the electromagnetic field source.

27. The switch of claim 23, wherein the electromagnetic field source comprises a coil assembly, a lower return core, an upper return core, and a mid core, the electromagnetic field source configured to generate an electromagnetic flux travelling in a first direction to transition the switch to the first state, and to generate an electromagnetic flux travelling in a second direction to transition the switch to the second state.

28. The switch of claim 23, comprising a fail safe circuit coupled to the electromagnetic field source and configured to provide an electromagnetic discharge to transition the switch between the first and second states when the electromagnetic field source is inoperable.

29. The switch of claim 28, wherein the fail safe circuit comprises a capacitor.

30. The switch of claim 28, wherein the fail safe circuit comprises a battery.

31. The switch of claim 23, comprising a magnet housing surrounding the magnet.

32. The switch of claim 23, wherein the first circuit is a circuit coupled to a HTS circuit and the second circuit is a bypass circuit.

33. The switch of claim 23, wherein in the first state, the first circuit is operable, and in the second state, the second circuit is operable.

34. The switch of claim 23, further comprising first and second contact points on the elongate member, wherein the first contact point is coupled with the contact pad of the first circuit in the first state, and the second contact point is coupled with the contact pad of the second circuit in the second state.

35. A HTS-based RF receiver comprising:
   a cryogenic enclosure in thermal communication with a cryocooler,
   a HTS filter having an input operatively coupled to a RF input, and an output coupled to a low noise amplifier, the low noise amplifier having an output coupled to a RF output, the HTS filter and the low noise amplifier being disposed within the cryogenic enclosure,
   a bypass system comprising a first switch, a second switch, and a bypass circuit disposed between the first switch and the second switch, wherein each switch comprises
      a first switch assembly comprising an elongate member and a magnet on an end of the elongate member, the magnet being coupled to a contact pad for the bypass circuit in a bypass state and coupled to a contact pad for a HTS circuit in a HTS state, the HTS circuit being in communication with the HTS filter,
      a second switch assembly comprising an elongate member and a magnet on an end of the elongate member, the magnet being coupled to a contact pad for the bypass circuit in a bypass state and coupled to a contact pad for the HTS in a HTS state, and
      an electromagnetic field source coupled to the first and second switch assemblies.

36. The receiver of claim 35, wherein the bypass system is disposed within the cryogenic enclosure.

37. The receiver of claim 35, wherein the receiver is mounted atop a tower.

38. The receiver of claim 35, wherein each switch assembly is transitioned between the HTS state and the bypass state by application of an electromagnetic field from the electromagnetic field source.

39. The receiver of claim 35, wherein each switch assembly is maintained in either the HTS state or the bypass state without a constant application of an electromagnetic field from the electromagnetic field source.

40. The receiver of claim 35, wherein the bypass system further comprises a fail safe circuit coupled to the electromagnetic field source, wherein the fail safe circuit provides an electromagnetic discharge to transition each switch assembly between the HTS and bypass states.

41. The receiver of claim 40, wherein the fail safe circuit comprises a capacitor.

42. The receiver of claim 40, wherein the fail safe circuit comprises a battery.

43. A method of operating a RF receiver in a cryogenically cooled HTS RF filtering state and a bypass state, the method comprising the steps of:
   measuring an operating parameter of the RF receiver; and
   switching the RF receiver to the bypass state when the measured operating parameter is outside a predetermined operating range, wherein switching the RF receiver to the bypass state comprises
      applying an electromagnetic field to a switch having a switch assembly comprising an elongate member and a magnet, and
      terminating application of the electromagnetic field after the magnet of the switch assembly couples with the bypass circuit to complete the bypass circuit around a HTS RF filter.

44. The method of claim 43, further comprising, when the measured operating parameter is within a pre-determined operating range, switching the RF receiver to the RF filtering active state, wherein switching the RF receiver to the cryogenically cooled HTS RF filtering state comprises:
   applying an electromagnetic field to the bypass switch, and
   terminating application of the electromagnetic field after the magnet of the switch assembly couples with and completes a cryogenically cooled HTS RF filtering circuit, the cryogenically cooled HTS RF filtering circuit comprising a circuit in communication with a HTS RF filter.

46. The method of claim 43, wherein the measured operating parameter comprises a direct parameter.

46. The method of claim 43, wherein the measured operating parameter comprises an inferred parameter.

47. The method of claim 43, wherein the measured operating parameter is a parameter chosen from the group consisting of receiver S parameter, noise figure, intermodulation, and dropped call rate.

48. The method of claim 43, wherein the measured operating parameter is a parameter chosen from the group consisting of system temperature, LNA current, cryocooler temperature, cold stage temperature, and cryocooler heat rejector temperature.

* * * * *